(12) United States Patent
Nelson et al.

(10) Patent No.: US 9,819,012 B2
(45) Date of Patent: Nov. 14, 2017

(54) METHODS OF MAKING METAL-DOPED NICKEL OXIDE ACTIVE MATERIALS

(71) Applicant: DURACELL U.S. OPERATIONS, INC., Wilmington, DE (US)

(72) Inventors: Jennifer Anne Nelson, Waltham, MA (US); Paul Albert Christian, Norton, MA (US); Kirakodu S. Nanjundaswamy, Potomac Falls, VA (US); Fan Zhang, Newtown, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 0 days.

(21) Appl. No.: 15/393,069

(22) Filed: Dec. 28, 2016

(65) Prior Publication Data

US 2017/0110718 A1    Apr. 20, 2017

Related U.S. Application Data

(63) Continuation of application No. 14/636,583, filed on Mar. 3, 2015, now Pat. No. 9,543,576, which is a
(Continued)

(51) Int. Cl.
*H01M 4/32* (2006.01)
*H01M 4/62* (2006.01)
(Continued)

(52) U.S. Cl.
CPC ............ *H01M 4/32* (2013.01); *C01G 53/42* (2013.01); *H01M 4/525* (2013.01); *H01M 4/625* (2013.01);
(Continued)

(58) Field of Classification Search
CPC .............. C01P 2002/72; C01P 2004/03; C01P 2006/40; C01G 53/42; H01M 4/32; H01M 2004/028
(Continued)

(56) References Cited

U.S. PATENT DOCUMENTS 2,956,860 A    10/1960 Welsch et al.
3,437,435 A    4/1969 Moore et al.
(Continued)

FOREIGN PATENT DOCUMENTS

CA    1263697 A    12/1989
EP    0702421 A1    3/1996
(Continued)

OTHER PUBLICATIONS

Kang et al., "The Effects of Acid Treatment on the Electrochemical Properties of 0.5Li2MnO3.0.5LiNi0.44Co0.25Mn0.3102 Electrodes in Lithium Cells," J. of the Electrochemical Society 153(6) pp. AI 186-A1192 (2006).*
(Continued)

*Primary Examiner* — Stewart Fraser
*Assistant Examiner* — Rashid Alam
(74) *Attorney, Agent, or Firm* — Marshall, Gerstein & Borun LLP

(57) ABSTRACT

Methods of making high-energy cathode active materials for primary alkaline batteries are described. The primary batteries include a cathode having an alkali-deficient nickel (IV)-containing oxide including one or more metals such as Co, Mg, Al, Ca, Y, Mn, and/or non-metals such as B, Si, Ge or a combination of metal and/or non-metal atoms as dopants partially substituted for Ni and/or Li in the crystal lattice; an anode; a separator between the cathode and the anode; and an alkaline electrolyte solution.

8 Claims, 11 Drawing Sheets

Related U.S. Application Data continuation of application No. 13/425,536, filed on Mar. 21, 2012, now Pat. No. 9,028,564.

(51) Int. Cl.
*H01M 4/525* (2010.01)
*C01G 53/00* (2006.01)
*H01M 4/02* (2006.01)

(52) U.S. Cl.
CPC ...... *C01P 2002/72* (2013.01); *C01P 2004/03* (2013.01); *C01P 2006/40* (2013.01); *H01M 2004/028* (2013.01)

(58) Field of Classification Search
USPC ........................................................ 29/623.1
See application file for complete search history.

(56) References Cited

U.S. PATENT DOCUMENTS

| | | | |
|---|---|---|---|
| 3,520,729 A | 7/1970 | Voss et al. | |
| 4,136,236 A | 1/1979 | Ruetschi | |
| 4,192,914 A | 3/1980 | Ruetschi | |
| 4,246,253 A | 1/1981 | Hunter | |
| 4,312,930 A | 1/1982 | Hunter | |
| 4,383,029 A | 5/1983 | Yamada et al. | |
| 4,451,543 A | 5/1984 | Dzieciuch et al. | |
| 4,777,100 A | 10/1988 | Chalilpoyil et al. | |
| 4,959,282 A | 9/1990 | Dahn et al. | |
| 4,980,080 A | 12/1990 | Lecerf et al. | |
| 5,180,574 A | 1/1993 | Von Sacken | |
| 5,264,201 A | 11/1993 | Dahn | |
| 5,277,890 A | 1/1994 | Wang et al. | |
| 5,348,726 A | 9/1994 | Wang et al. | |
| 5,391,365 A | 2/1995 | Wang et al. | |
| 5,425,932 A | 6/1995 | Tarascon | |
| 5,482,796 A | 1/1996 | Wang et al. | |
| 5,532,084 A | 7/1996 | Wang et al. | |
| 5,587,133 A | 12/1996 | Amatucci et al. | |
| 5,629,110 A | 5/1997 | Kobayashi et al. | |
| 5,720,932 A | 2/1998 | Amine et al. | |
| 5,759,510 A | 6/1998 | Pillai | |
| 5,772,890 A | 6/1998 | Hubred | |
| 5,783,334 A | 7/1998 | Yasuda | |
| 5,798,180 A | 8/1998 | Chowdhury et al. | |
| 5,910,366 A | 6/1999 | Chowdhury et al. | |
| 5,952,124 A | 9/1999 | Kainthla et al. | |
| 5,955,051 A | 9/1999 | Li et al. | |
| 5,955,052 A | 9/1999 | Padhi et al. | |
| 6,040,090 A * | 3/2000 | Sunagawa ............... | C01G 53/50 429/223 |
| 6,074,784 A | 6/2000 | Maruta | |
| 6,162,561 A | 12/2000 | Wang et al. | |
| 6,270,921 B1 | 8/2001 | Kaplan et al. | |
| 6,274,270 B1 | 8/2001 | Audry et al. | |
| 6,284,410 B1 | 9/2001 | Durkot et al. | |
| 6,334,993 B1 | 1/2002 | Suita et al. | |
| 6,335,119 B1 | 1/2002 | Maruta | |
| 6,428,766 B1 | 8/2002 | Fujino et al. | |
| 6,472,103 B1 | 10/2002 | Durkot et al. | |
| 6,492,062 B1 | 12/2002 | Wang et al. | |
| 6,509,117 B1 | 1/2003 | Bowden et al. | |
| 6,521,378 B2 | 2/2003 | Durkot et al. | |
| 6,566,009 B1 | 5/2003 | Noya et al. | |
| 6,589,693 B1 | 7/2003 | Kilby et al. | |
| 6,620,550 B2 | 9/2003 | Christian et al. | |
| 6,645,667 B1 | 11/2003 | Iwamoto et al. | |
| 6,667,131 B1 | 12/2003 | Vitins et al. | |
| 6,753,109 B2 | 6/2004 | Nanjundaswamy et al. | |
| 6,759,166 B2 | 7/2004 | Wang et al. | |
| 6,783,893 B2 | 8/2004 | Bowden et al. | |
| 6,794,082 B2 | 9/2004 | Mori et al. | |
| 6,818,347 B1 | 11/2004 | Jin et al. | |
| 6,858,349 B1 | 2/2005 | Luo et al. | |
| 6,932,846 B2 | 8/2005 | Bowden et al. | |
| 6,991,875 B2 | 1/2006 | Christian et al. | |
| 7,045,247 B1 | 5/2006 | Copeland et al. | |
| 7,045,252 B2 | 5/2006 | Christian et al. | |
| 7,081,319 B2 | 7/2006 | Christian et al. | |
| 7,247,407 B2 | 7/2007 | Durkot et al. | |
| 7,273,680 B2 | 9/2007 | Durkot et al. | |
| 7,407,521 B2 | 8/2008 | Shimakawa et al. | |
| 7,407,726 B2 | 8/2008 | Wang et al. | |
| 7,435,395 B2 | 10/2008 | Durkot et al. | |
| 7,569,306 B2 | 8/2009 | Kato et al. | |
| 7,914,920 B2 | 3/2011 | Davis et al. | |
| 8,048,556 B2 | 11/2011 | Davis et al. | |
| 8,703,336 B2 | 4/2014 | Richards et al. | |
| 9,028,564 B2 | 5/2015 | Nelson et al. | |
| 2002/0172867 A1 | 11/2002 | Anglin | |
| 2004/0009400 A1 | 1/2004 | Yamaguchi et al. | |
| 2005/0079424 A1 | 4/2005 | Davis et al. | |
| 2005/0152830 A1 | 7/2005 | Yasutomi et al. | |
| 2005/0221181 A1 | 10/2005 | Durkot et al. | |
| 2006/0188781 A1 | 8/2006 | Thackeray et al. | |
| 2006/0204839 A1 | 9/2006 | Richards et al. | |
| 2007/0015054 A1 | 1/2007 | Nunome et al. | |
| 2007/0248879 A1 | 10/2007 | Durkot et al. | |
| 2008/0008937 A1 | 1/2008 | Eylem et al. | |
| 2008/0171276 A1 | 7/2008 | Kato et al. | |
| 2008/0193487 A1 | 8/2008 | Schild et al. | |
| 2008/0193847 A1 | 8/2008 | Suetsugu et al. | |
| 2008/0241683 A1 | 10/2008 | Fensore et al. | |
| 2009/0047578 A1 | 2/2009 | Iwamoto et al. | |
| 2009/0123842 A1 | 5/2009 | Thackeray et al. | |
| 2009/0249614 A1 | 10/2009 | Davis et al. | |
| 2009/0258297 A1 | 10/2009 | Davis et al. | |
| 2010/0003596 A1 | 1/2010 | Sato et al. | |
| 2010/0119943 A1* | 5/2010 | Lee .................... | H01M 4/48 429/220 |
| 2011/0151329 A1 | 6/2011 | Bernard et al. | |
| 2011/0219607 A1 | 9/2011 | Nanjundaswamy et al. | |
| 2011/0220842 A1 | 9/2011 | Nanjundaswamy et al. | |
| 2011/0223477 A1 | 9/2011 | Nelson et al. | |
| 2011/0223483 A1 | 9/2011 | Koga et al. | |
| 2011/0223493 A1* | 9/2011 | Christian ................ | H01M 4/06 429/344 |
| 2013/0247363 A1 | 9/2013 | Nelson et al. | |
| 2013/0252085 A1 | 9/2013 | Nelson et al. | |

FOREIGN PATENT DOCUMENTS

| | | |
|---|---|---|
| EP | 1130670 A1 | 9/2001 |
| JP | S52155321 A | 12/1977 |
| JP | S58175265 A | 10/1983 |
| JP | S58194260 A | 11/1983 |
| JP | H06267538 A | 9/1994 |
| JP | H09320601 A | 12/1997 |
| JP | H10503466 A | 3/1998 |
| JP | H1140153 A | 2/1999 |
| JP | 2001332259 A | 11/2001 |
| JP | 2003151549 A | 5/2003 |
| JP | 2007026896 A | 2/2007 |
| JP | 2007258036 A | 10/2007 |
| WO | WO-95/21470 A1 | 8/1995 |
| WO | WO-96/24168 A1 | 8/1996 |
| WO | WO-2007015054 | 2/2007 |
| WO | WO-2009082862 A1 | 7/2009 |
| WO | WO-2011/112758 A1 | 9/2011 |

OTHER PUBLICATIONS

PCT International Search Report with Written Opinion in corresponding Int'l appln. PCT/US2013/033212 dated Jul. 18, 2013.

Abbas, et al. "Hydroxyl as a Defect of the Manganese Dioxide Lattice and its Applications to the Dry Cell Battery." *Journal of Power Sources* 58, No. 1 (1996): 15-21.

Alcantara, et al. "Chemically Deintercalated Cathode Materials for Lithium Cells." *Ionics* 1, No. 3 (1995): 246-250, (Abstract only).

Alcantara, et al. "Structure and Electrochemical Propertes of $Li_{1-x}(Ni_yCo_{1-y})_{1+x}O_2$ Effect of Chemical Delithiation at 0° C." *Journal of the Electrochemical Society* 142, No. 12 (1995): 3997-4005.

(56) References Cited

OTHER PUBLICATIONS

Ammundsen, et al. "Effect of Chemical Extraction of Lithium on the Local Structure of Spinel Lithium Manganese Oxides Determined by X-ray Absorption Spectroscopy," *Chemistry of Materials* 8, No. 12 (1996): 2799-2808.

Ammundsen, et al. "Mechanism of Proton Insertion and Characterization of the Proton Sites in Lithium Manganate Spinets." *Chemistry of Materials* 7, No. 11 (1995): 2151-2160.

Arai, et al, "Characteristics of $Li_x NiO_2$ Obtained by Chemical Delithiation." *Journal of Power Sources* 81 (1999): 401-405.

Arai, et al. "Nickel Dioxide Polymorphs as Lithium Insertion Electrodes." *Electrochimica Acta* 47, No. 17 (2002): 2697-2705.

Arai, et al. "Structural and Thermal Characteristics of Nickel Dioxide Derived from $LiNiO_2$." *Journal of Solid State Chemistry* 163, No. 1 (2002): 340-349.

Arai, et al. "Synthesis and Electrode Performance of Layered Nickel Dioxide Containing Alkaline Ions." *Electrochimica Acta* 50. n . 9 (2005): 1821-1828.

Ariza, et al. "Probing the Local Structure and the Role of Protons in Lithium Sorption Processes of a New Lithium-Rich Manganese Oxide." *Chemistry of Materials* 18, No. 7 (2006): 1885-1890.

Armstrong, et al. "Demonstrating Oxygen Loss and Associated Structural Reorganization in the Lithium Battery Cathode $Li[Ni_{0.2}Li_{0.2}Mn_{0.6}]O_2$." *Journal of the American Chemical Society* 128, No. 26 (2006): 8694-8698.

Arunkumar, et al. "Chemical and Structural Instability of the Chemically Delithiated $(1-z)Li\ [Li_{1/3}Mn_{2/3}]\ O_2\ (z)\ Li\ [Co_{1-y}Ni_y]O_2\ (0 \le y \le 1\ and\ 0 \le z \le 1)$ Solid Solution Cathodes." *Journal of Materials Chemistry* 18, No. 2 (2008): 190-198.

Axmann, et al. "Formation of $Fe^{IV}$ and $Ni^{IV}$ by Electrochemical and Chemical Oxidation of an Iron-Substituted Nickel(II) Hydroxide: The Direct Two-Electron Step $Ni^{II} \rightarrow Ni^{IV}+2e^-$." *Angewandte Chemie International Edition in English* 35, No. 10 (1996): 1115-1118.

Axmann, et al. "Nickel Hydroxide as a Matrix for Unusual Valencies: the Electrochemical Behaviour of Metal (III)-Ion-Substituted Nickel Hydroxides of the Pyroaurite Type." *Journal of Alloys and Compounds* 246, No. 1 (1997): 232-241 (abstract only).

Benhaddad, et al. "Reactivity of Nanostructured $MnO_2$ in Alkaline Medium Studied with a Micro-Cavity Electrode: Effect of Synthesizing Temperature." *ACS Applied Materials & Interfaces* 1, No. 2 (2009): 424-432.

Blsa, et al. "A New Route to $\gamma$-$Fe_2O_3$ via an Intermediate Oxyhydroxide. The Reaction of $\alpha$-$NaFeO_2$ with Benzoic Acid," *Journal of Materials Chemistry* 9, No. 1 (1999): 227-231.

Blesa, et al. "Nonstoichiometric Spinel Ferrites Obtained From $\alpha$-$NaFeO_2$ via Molten Media Reactions." *Inorganic Chemistry* 41, No. 23 (2002): 5961-5967. (Abstract only).

Blesa, et al. "$\alpha$-$NaFeO_2$: Ionic Conductivity and Sodium Extraction." *Solid State Ionics* 126, No. 1 (1999): 81-87.

Bolibar, et al. "Synthesis, Characterization and Thermal Decomposition Study of Some Nickelnitro Derivatives," *Journal of Materials Chemistry* 7, No. 11 (1997): 2259-2264.

Cheng, et al. "Facile Controlled Synthesis of $MnO_2$ Nanostructures of Novel Shapes and Their Application in Batteries." *Inorganic Chemistry* 45, No. 5 (2006): 2038-2044.

Chitrakar, et al. "A New Type of Manganese Oxide ($MnO_2$ $0.5H_2O$) Derived from $Li_{1.6}Mn_{1.6}O_4$ and Its Lithium Ion-Sieve Properties." *Chemistry of Materials* 12, No. 10 (2000): 3151-3157.

Choi, et al. "Proton Insertion into Oxide Cathodes During Chemical Delithiation." *Electrochemical and Solid-State Letters* 9, No. 5 (2006): A241-A244.

Croguennec, et al. "Structural Characterisation of the Highly Deintercalated $Li_xNi_{1.02}O_2$ Phases (with $x \le 0.30$)" *Journal of Materials Chemistry* 11 , No. 1 (2001): 131-141.

Crompton, Battery Reference Book, "Guidelines to battery selection", 3$^{rd}$ ed., Oxford: Reed Educational and Professional Publishing, Ltd. Chapter 2 (2000).

Dahn, et al. "Structure and Electrochemistry of $Li_{1+y}NiO_2$ and a New $Li_2 NiO_2$ Phase With the $Ni (OH)_2$ Structure." *Solid State Ionics* 44, No. 1 (1990): 87-97.

Dai et al., "Preparation and Characterization of Nanostructured $MnO_2$ for Lithium Batteries", Proc. 40$^{th}$ Power Sources Conf., pp. 283-286 (2002).

David, et al. "Structure Refinement of the Spinel-Related Phases $Li_2Mn_2O_4$ and $Li_{0.2}Mn_2O_4$. " *Journal of Solid State Chemistry* 67, No. 2 (1987): 316-323.

Delmas, et al. "On the Behavior of the $Li_xNiO_2$ System: an Electrochemical and Structural Overview." *Journal of Power Sources* 68, No. 1 (1997): 120-125.

Dominko, et al. "A Novel Coating Technology for Preparation of Cathodes in Li-ion Batteries." *Electrochemical and Solid-State Letters* 4, No. 11 (2001): A187-A190.

Dutta, et al. "Chemical Synthesis and Properties of $Li_{1-\delta-x}Ni_{1+\delta}O_2$ and $Li[Ni_2]O_4$." *Journal of Solid State Chemistry* 96, No. 1 (1992): 123-131.

Ebner, et al. "The $LiNiO_2$/Carbon Lithium-Ion Battery." *Solid State Ionics* 69, No. 3 (1994): 238-256.

Endres, et al. "Extraction of Lithium from Spinel Phases of the System $Li_{1+x} Mn_{2-x}O_{4-\delta}$." *Journal of Power Sources* 69, No. 1 (1997): 145-156.

Fang, et al. "Low-Temperature Synthesis of Highly Crystallized $LiMn_2O_4$ from Alpha Manganese Dioxide Nanorods." *Journal of Power Sources* 184, No. 2 (2008): 494-497.

Feng, et al. "Alkali Metal Ions Insertion/Extraction Reactions with Hollandite-Type Manganese Oxide in the Aqueous Phase." *Chemistry of Materials* 7, No. 1 (1995): 148-153.

Feng, et al. "Synthesis of Hollandite-Type Manganese Dioxide with $H^+$ Form for Lithium Rechargeable Battery." *Journal of the Electrochemical Society* 141, No. 10 (1994): L135-L136.

Feng et al. "$Li^+$ Extraction/Insertion with Spinel-Type Lithium Manganese Oxides. Characterization of Redox-Type and Ion-Exchange-Type Sites", Langmuir 8:1861-1867 (1992).

Fong, et al. "A Powder Neutron Diffraction Study of $\lambda$ and $\gamma$ Manganese Dioxide and of $LiMn_2O_4$." *Zeitschrift Fuer Kristallographie* 209, No. 12 (1994): 941-945.

Franger, et al. "Development of New Low Temperature Manganese Oxides as Lithium Insertion Compounds." *Recent Research Developments Solid State Ionics* 3 (2006): 1-22. (abstract only).

Gao, et al. "Synthesis and Characterization of $Li_{1+x} Mn_{2-x} O_4$ for Li-Ion Battery Applications." *Journal of the Electrochemical Society* 143, No. 1 (1996): 100-114.

Gummow, et al. "Improved Capacity Retention in Rechargeable 4 V Lithium/Lithium-Manganese Oxide (Spinel) Cells." *Solid State Ionics* 69, No. 1 (1994): 59-67.

Hill, et al. "Electrochemical Synthesis of Beta-and Gamma-Manganese Dioxides Under Hydrothermal Conditions." *Electrochemical and Solid-State Letters* 4, No. 6 (2001): D1-D3.

Hunter, et al. "Nonaqueous Electrochemistry of Lambda $MnO_2$." *Proc. Electrochem. Soc* 85 (1984): 4.

Hunter, et al. "Preparation of a New Crystal Form of Manganese Dioxide: $\lambda$-$MnO_2$." *Journal of Solid State Chemistry* 39, No. 2 (1981): 142-147.

Ji, et al. "Simple Fabrication of Nano-Sized $NiO_2$ Powder and its Application to Oxidation Reactions." *Applied Catalysis A: General* 282, No. 1 (2005): 25-30. (Abstract only).

Kang, et al. "The Effects of Acid Treatment on the Electrochemical Properties of $0.5\ Li_2MnO_3 \bullet 0.5\ LiNi_{0.44}Co_{0.25}Mn_{0.31}O_2$ Electrodes in Lithium Cells." Journal of the Electrochemical Society 153, No. 6 (2006): A1186-A1192.

Kanoh, et al. "In Situ Raman Spectroscopic Study on Electroinsertion of $Li^+$ into a Pt/$\lambda$-$MnO_2$ Electrode in Aqueous Solution." *Electrochemical and Solid-State Letters* 1, No. 1 (1998): 17-19.

Kanoh, et al. "Selective Electroinsertion of Lithium Ions Into a Pt/$\lambda$-$MnO_2$ Electrode in the Aqueous Phase." *Langmuir* 7, No. 9 (1991): 1841-1842.

Kanzaki, et al. "Mechanism of Lithium Ion Insertion into $\lambda$-$MnO_2$." *Journal of the Electrochemical Society* 138, No. 1 (1991): 333-334.

Kao, et al. "Phase Transformation of Gamma-EMD to Beta Manganese Dioxide During Digestion in Sulfuric Acid." *Journal of the Electrochemical Society* 134, No. 6 (1987): 1321-1325.

(56) References Cited

OTHER PUBLICATIONS

Kijima, et al. "Preparation and Characterization of Open Tunnel Oxide α-$MnO_2$ Precipitated by Ozone Oxidation." *Journal of Solid State Chemistry* 159, No. 1 (2001): 94-102.

Kim, et al. "Direct Carbon-Black Coating on $LiCoO_2$ Cathode Using Surfactant for High-Density Li-Ion Cell." *Journal of Power Sources* 139, No. 1 (2005): 289-294.

Komaba, et al. "Preparation and Electrochemical Performance of Composite Oxide of Alpha Manganese Dioxide and Li—Mn—O Spinel." *Electrochimica Acta* 50, No. 11 (2005): 2297-2305.

Komaba, et al. "Synthesis of Layered $MnO_2$ by Calcination of $KMnO_4$ for Rechargeable Lithium Battery Cathode." *Electrochimica Acta* 46, No. 1 (2000): 31-37.

Kosova, et al. "Comparative Study of $LiCoO_2$ Surface Modified with Different Oxides." *Journal of Power Sources* 174, No. 2 (2007): 959-964.

Kozawa. "Formation of Manganate and Permanganate Ions from Manganese-Dioxide in Aqueous Solution." *Journal Electrochemical Society of Japan* 44, No. 8 (1976): 508-513.

Lander, et al. "Barium-Nickel Oxides with Tri-and Tetravalent Nickel." *Journal of the American Chemical Society* 73, No. 6 (1951): 2452-2454.

Larcher, et al. "Synthesis of $MnO_2$ Phases from $LiMn_2O_4$ in Aqueous Acidic Media Mechanisms of Phase Transformations, Reactivity, and Effect of Bi Species." *Journal of the Electrochemical Society* 145, No. 10 (1998): 3392-3400.

Lavela, et al. "Chemical Delithiation, Thermal Transformations and Electrochemical Behaviour of Iron-Substituted Lithium Nickelate." In *Materials Research Society Symposium Proceedings*, vol. 658, pp. GG9-7. Cambridge University Press, 2000. (Abstract only).

Lavela, et al. "Effects of Partial Acid Delithiation on the Electrochemical Lithium Insertion Properties of Nickel-Stabilized $LiMn_2O_4$ Spinel Oxides." *Journal of Solid State Chemistry* 150, No. 1 (2000): 196-203.

Lee, et al. "Identification of a New Strontium Ni(III) Oxide Prepared in Molten Hydroxides." *Journal of Solid State Chemistry* 93, No. 1 (1991): 267-271.

Linden and T. B. Rebby, *Handbook of Batteries*, New York: McGraw-Hill Co., Inc. (1995) "1.4 Classification of Cells and Batteries," pp. 1.9-1.11; "7.1 General Characteristics and Applications of Primary Batteries," pp. 7.3-7.7; "11/13 Lithium/Bismuth Oxide Cells," pp. 11-79 to 11-81; Chapter 12, "Silver Oxide Cells," pp. 12.1-12-16; "23.1 General Characteristics and Applications of Secondary Batteries," pp. 23.3-23.12.

Liu, et al. "Preparation and Alkali-Metal Ion Extraction/Insertion Reactions with Nanofibrous Manganese Oxide Having 2×4 Tunnel Structure." *Chemistry of Materials* 15, No. 19 (2003): 3696-3703.

Lu, et al. "Characterization of Structure and Electrochemical Properties of Lithium Manganese Oxides for Lithium Secondary Batteries Hydrothermally Synthesized from δ-$K_xMnO_2$." *Electrochimica Acta* 49, No. 14 (2004): 2361-2367.

Lubin, et al. "Chemical Lithium Extraction from Manganese Oxides for Lithium Rechargeable Batteries." *Journal of Power Sources* 34, No. 2 (1991): 161-173.

Maruta, et al. "Low-Temperature Synthesis of Lithium Nickelate Positive Active Material from Nickel Hydroxide for Lithium Cells." *Journal of Power Sources* 90, No. 1 (2000): 89-94.

Morales, et al. "Acid-Delithiated $Li_{1-x}(Ni_yCo_{1-y})_{1+x}O_2$ as Insertion Electrodes in Lithium Batteries." *Journal of Solid State Chemistry* 113, No. 1 (1994): 182-192. (Abstract only).

Morales, et al. "Cation Distribution and Chemical Deintercalation of $Li_{1-x}Ni_{1+x}O_2$." *Materials Research Bulletin* 25, No. 5 (1990): 623-630.

Morales, et al. "Thermal Behaviour of Chemically Deintercalated $Li_{1-1}Ni_{1+x}O_2$." *Journal of Thermal Analysis* 38, No. 3 (1992): 295-301. (Abstract only).

Mosbah, et al. "Phases $Li_xMnO_2$λ Rattachees au Type Spinelle." *Materials Research Bulletin* 18, No. 11 (1983): 1375-1381.

Motohashi, et al. "Synthesis and Properties of $CoO_2$, the x=0 End Member of the $Li_xCoO2$ and $Na_xCoO_2$ Systems." *Chemistry of Materials* 19, No. 21 (2007): 5063-5066.

Nishimura, et al. *Shigen to Sozai* 107, 805-10 (1991).

Ohzuku, et al. "Electrochemistry and Structural Chemistry of $LiNiO_2$ (R3m) for 4 Volt Secondary Lithium Cells." *Journal of the Electrochemical Society* 140, No. 7 (1993): 1862-1870.

Ohzuku, et al. "Electrochemistry of Manganese Dioxide in Lithium Nonaqueous Cell III. X-Ray Diffractional Study on the Reduction of Spinel-Related Manganese Dioxide." *Journal of the Electrochemical Society* 137, No. 3 (1990): 769-775.

Ooi, et al. "Lithium-Ion Insertion/Extraction Reaction with λ-$MnO_2$ in the Aqueous Phase." *Chemistry Letters* 17, No. 6 (1988): 989-992.

Ooi, et al. "Mechanism of Lithium (1+) Insertion in Spinel-Type Manganese Oxide. Redox and Ion-Exchange Reactions." *Langmuir* 7, No. 6 (1991): 1167-1171.

Palacin, et al. "Low-Temperature Synthesis of $LiNiO_2$ Reaction Mechanism, Stability, and Electrochemical Properties." *Journal of the Electrochemical Society* 144, No. 12 (1997): 4226-4236.

Patrice, et al. "Understanding the Second Electron Discharge Plateau in $MnO_2$-Based Alkaline Cells." *Journal of the Electrochemical Society* 148, No. 5 (2001): A448-A455.

Puckhaber, et al. "Particle Sizing-Laser Diffraction: Millennium-Link for Particle Size Analysis." *Powder Handling and Processing* 11, No. 1 (1999): 91-95.

Read, et al. "Low Temperature Performance of λ $MnO_2$ in Lithium Primary Batteries." *Electrochemical and Solid-State Letters* 4, No. 10 (2001): A162-A165.

Rossouw, et al. "Alpha Manganese Dioxide for Lithium Batteries: a Structural and Electrochemical Study." *Materials Research Bulletin* 27, No. 2 (1992): 221-230.

Schilling, et al. "Thermodynamic Stability of Chemically Delithiated Li ($Li_xMn_{2-x}$) $O_4$." *Journal of the Electrochemical Society* 145, No. 2 (1998): 569-575.

Schilling, et al. "Modification of the High-Rate Discharge Behavior of Zn—$MnO_2$ Alkaline Cells Through the Addition of Metal Oxides to the Cathode." *ITE Letters on Batteries, New Technologies & Medicine* 2, No. 3 (2001): 341-348.

Shen, et al. "Phase Transitions and Ion Exchange Behavior of Electrolytically Prepared Manganese Dioxide." *Journal of Solid State Chemistry* 64, No. 3 (1986): 270-282.

Stoyanova, et al. "Effect of Mn-Substitution for Co on the Crystal Structure and Acid Delithiation of $LiMn_yCo_{1-y}O_2$ Solid Solutions." *Solid State Ionics* 73, No. 3-4 (1994): 233-240.

Stoyanova, et al. "New Data on Chemical Delithiation of $Li_xNi_{2-x}O_2$ (0.6 <x <1)." *Journal of Solid State Chemistry* 108, No. 2 (1994): 211-218.

Sun, et al. "Low Temperature Synthesis of Layered $LiNiO_2$ Cathode Material in Air Atmosphere by Ion Exchange Reaction." *Solid State Ionics* 177, No. 13 (2006): 1173-1177.

Takeda, et al. "Crystal Chemistry and Physical Properties of $La_{2-x}Sr_xNiO_4$ (0 ≤x ≤1.6)." *Materials Research Bulletin* 25, No. 3 (1990): 293-306.

Tang, et al. "Lithium Ion Extraction from Orthorhombic $LiMnO_2$ in Ammonium Peroxodisulfate Solutions." *Journal of Solid State Chemistry* 142, No. 1 (1999): 19-28.

Tang, et al. "Preparation of Plate-Form Manganese Oxide by Selective Lithium Extraction from Monoclinic $Li_2MnO_3$ under Hydrothermal Conditions." *Chemistry of Materials* 12, No. 11 (2000): 3271-3279.

Thackeray. "Manganese Oxides for Lithium Batteries." *Progress in Solid State Chemistry* 25, No. 1 (1997): 1-71.

Venkatraman, et al. "Factors Influencing the Chemical Lithium Extraction Rate from Layered $LiNi_{1-y-z}Co_yMnzO_2$ Cathodes." *Electrochemistry Communications* 6, No. 8 (2004): 832-837.

Walanda, et al. Hydrothermal $MnO_2$: Synthesis, Structure, Morphology and Discharge Performance. *Journal of Power Sources* 139, No. 4 (2005): 325-341.

Wang, et al. "Selected-Control Hydrothermal Synthesis of α- and β-$MnO_2$ Single Crystal Nanowires." *Journal of the American Chemical Society* 124, No. 12 (2002): 2880-2881.

(56) References Cited

OTHER PUBLICATIONS

Wang, et al. "A Novel Chemically Synthesized Manganese Dioxide—Its Preparation and Structural Characterization." *Progress in Batteries and Battery Materials* 17 (1998): 222-231.

Xia et al. "Study on the electrochemical performance of $\lambda$-$MnO_2$ in alkaline solution", Dianyuan Jishu, vol. 23(Suppl.):74-76 (1999)(abstract only).

Yang, et al. "Synthesis of $Li_{1.33}Mn_{1.67}O_4$ Spinels with Different Morphologies and Their Ion Adsorptivities After Delithiation." *Journal of Materials Chemistry* 10, No. 8 (2000): 1903-1909.

Yin, et al. "X-ray/Neutron Diffraction and Electrochemical Studies of Lithium De/Re-Intercalation in $Li_{1-x}Co_{1/3}Ni_{1/3}Mn_{1/3}O_2$ (x=$\rightarrow$1)." *Chemistry of Materials* 18, No. 7 (2006): 1901-1910.

Zhecheva, et al. "New Phases Obtained by Acid Delithiation of Layered LiMO2 (M = Co, Ni)." In *Materials Science Forum*, vol. 152, pp. 259-262. Trans Tech Publications, 1994.

Zhecheva, et al. "$Li_{1-x-y}H_yCoO_2$: Metastable Layered Phases Obtained by Acid Digestion of $LiCoO_2$ ($O_3$)." *Journal of Solid State Chemistry* 109, No. 1 (1994): 47-52. (Abstract only).

* cited by examiner

METHODS OF MAKING METAL-DOPED NICKEL OXIDE ACTIVE MATERIALS

FIELD OF THE INVENTION

This invention relates to methods of making cathode active materials, and more particularly to methods of making nickel (IV)-containing cathode active materials.

BACKGROUND OF THE INVENTION

Batteries, such as alkaline batteries, are commonly used as electrical energy sources. Generally, a battery contains a negative electrode (anode) and a positive electrode (cathode). The negative electrode contains an electroactive material (such as zinc particles) that can be oxidized; and the positive electrode contains an electroactive material (such as manganese dioxide) that can be reduced. The active material of the negative electrode is capable of reducing the active material of the positive electrode. In order to prevent direct reaction of the active material of the negative electrode and the active material of the positive electrode, the electrodes are mechanically and electrically isolated from each other by an ion-permeable separator.

When a battery is used as an electrical energy source for a device, such as a cellular telephone, electrical contact is made to the electrodes, allowing electrons to flow through the device and permitting the oxidation and reduction reactions to occur at the respective electrodes to provide electrical power. An electrolyte solution in contact with the electrodes contains ions that diffuse through the separator between the electrodes to maintain electrical charge balance throughout the battery during discharge.

SUMMARY OF THE INVENTION

This disclosure relates to a method for preparing high-capacity primary alkaline batteries including cathodes that include a layered nickel oxide with Ni having an average oxidation state greater than about +3.25 (e.g., greater than about +3.5, or greater than about +3.75) with one or more metal ions at least partially substituting for Ni ions in the crystal lattice (i.e., in solid solution), an oxidation resistant graphite; an anode including metallic zinc or zinc alloy particles (e.g., very fine zinc particles (i.e., −325 mesh)); an oxidation-resistant separator; and an alkaline electrolyte solution.

The method for the preparation of the layered nickel (IV)-containing cathode active material can include an acid treatment step to delithiate (i.e., remove and/or extract Li ions) a layered lithium nickel oxide precursor comprising one or more metal ions partially substituted for the Ni and/or Li ions in the crystal lattice. The partially substituted lithium nickel oxide precursor can be synthesized by heating a mixture comprising one or more lithium salts (e.g., lithium nitrate, lithium hydroxide, lithium chloride, a spherical β-nickel hydroxide and/or oxyhydroxide), and one or more metal powders, metal oxides or other metal salts (e.g., cobalt, aluminum, magnesium, manganese, cobalt oxide, cobalt hydroxide, cobalt nitrate, cobalt carbonate, aluminum oxide, aluminum hydroxide, magnesium oxide, magnesium hydroxide, calcium oxide, calcium hydroxide, calcium carbonate, yttrium oxide, yttrium hydroxide, manganese oxide, manganese carbonate), at an elevated temperature in flowing oxygen or an oxygen-enriched atmosphere.

In one aspect, the disclosure features a method of making a cathode active material, including the steps of combining an alkali-containing compound, a nickel-containing compound, one or more metal-containing compounds, and one or more non metal-containing compounds at a stoichiometric ratio of from 1:0.98:0.02:0 to 1:0.86:0.12:0.02 to form a mixture; heating the mixture at a first temperature above at least about 185° C. in flowing oxygen or an oxygen-enriched atmosphere for a first duration; cooling the mixture to at least about 40° C. in flowing oxygen or an oxygen-enriched atmosphere; heating the mixture at a second temperature above at least about 775° C. in flowing oxygen or an oxygen enriched atmosphere for a second duration to form a $ANi_{1-y-z-w}Co_yM^a_zM^b_wO_2$ precursor; and treating the $ANi_{1-y-z-w}Co_yM^a_zM^b_wO_2$ precursor with an aqueous acid solution at a temperature below about 10 °C. to form an alkali metal deficient nickel (IV) oxide having a formula $A_xNi_{1-y-z-w}Co_yM^a_zM^b_wO_2$; wherein A is an alkali metal, $M^a$ is a metal dopant, $M^b$ is a non-metal dopant, $0 \le x \le 0.12$, w is 0 or $0 \le w \le 0.02$, and $0.02 \le y+z \le 0.25$.

In another aspect, the disclosure features a method of making a battery, including incorporating a cathode including as the cathode active material, a lithium-deficient doped nickel(IV)-containing oxide prepared by acid treatment of a $LiNi_{1-y-z-w}Co_yM^a_zM^b_wO_2$ precursor having a layered or spinel-type crystal structure into the battery.

Embodiments of the methods may include one or more of the following features.

The alkali-containing compound can include lithium hydroxide monohydrate, lithium oxide, lithium carbonate, and lithium nitrate.

The nickel-containing compound can include nickel monoxide, nickel sesquioxide, nickel hydroxide, nickel oxyhydroxide, nickel carbonate, and/or nickel nitrate. In some embodiments, the nickel-containing compound can include β-nickel oxyhydroxide, metal-doped β-nickel oxyhydroxide, cobalt oxyhydroxide-coated β-nickel oxyhydroxide, γ-nickel oxyhydroxide, metal-doped γ-nickel oxyhydroxide, cobalt oxyhydroxide-coated γ-nickel oxyhydroxide, and/or a mixture of β-nickel oxyhydroxide and γ-nickel oxyhydroxide.

The metal-containing compound can include aluminum, magnesium, cobalt, and/or manganese metal powders. In some embodiments, the metal-containing compound can include cobalt oxide, aluminum oxide, magnesium oxide, calcium oxide, yttrium oxide, and/or manganese oxide. The metal-containing compound can include cobalt hydroxide, cobalt oxyhydroxide, cobalt carbonate, cobalt nitrate, aluminum hydroxide, magnesium hydroxide, magnesium carbonate, calcium hydroxide, calcium carbonate, yttrium hydroxide, manganese hydroxide, manganese carbonate, and/or manganese nitrate.

The non-metal-containing compound can include boron oxide, silicon powder, silicon dioxide, germanium powder, and/or germanium dioxide.

In some embodiments, the stoichiometric ratio of the nickel-containing compound to the one or more metal-containing compounds is between 0.98:0.02 to 0.80:0.20 (e.g., between 0.96:0.04 to 0.85:0.15, between 0.99:0.01 to 0.95:0.05).

In some embodiments, the first temperature is between 185 and 225° C. The second temperature can be between 750 and 850° C. (e.g., 775 and 825° C.). The first duration can be between 16 and 20 hours (e.g., 18 hours). The second duration can be between 24 and 60 hours (e.g., 48 hours).

In some embodiments, x is less than 0.1; $0.02 \le y \le 0.15$ (e.g., y is 0); $0.02 \le z \le 0.08$ (z is 0); $0 \le w \le 0.02$ (e.g., w is 0).

The alkali metal deficient nickel oxide can be selected from the group consisting of $Li_xNi_{1-y}Co_yO_2$, $Li_x$ $Ni_{1-z}Mg_zO_2$, $Li_xNi_{1-y-z}Co_yMg_zO_2$, $Li_xNi_{1-z}Al_zO_2$, $Li_xNi_{1-y-z}Co_yAl_zO_2$, $Li_xNi_{1-z}(Mg, Al)_zO_2$, $Li_xNi_{1-y-z}Co_y(Mg, Al)_zO_2$, $Li_xNi_{1-z}Ca_zO_2$, $Li_xNi_{1-y-z}Co_yCa_zO_2$, $Li_xNi_{1-z}Y_zO_2$, $Li_xNi_{1-y-z}Co_yY_zO_2$, $Li_xNi_{1-z}Mn_zO_2$, and $Li_xNi_{1-y-z}Co_yM_nO_2$.

The $LiNi_{1-y-z-w}Co_yM^a_zM^b_wO_2$ precursor can be treated with the aqueous acid solution for 20 to 60 hours. In some embodiments, the $LiNi_{1-y-z-w}Co_yM^a_zM^b_wO_2$ precursor is treated with the aqueous acid solution for at least 40 hours. The aqueous acid solution can include aqueous solutions of sulfuric acid, nitric acid, and/or hydrochloric acid. The aqueous acid solution can have a concentration of between 2 M and 12 M (e.g., 6 M). As an example, the $LiNi_{1-y-z-w}Co_yM^a_zM^b_wO_2$ precursor can be treated with an aqueous acid solution at a temperature of about zero degree or more and/or about ten degrees Celsius or less (e.g., about zero degree Celsius or more and/or about five degrees Celsius or less).

In some embodiments, the method of making a battery further includes incorporating an anode including zinc or zinc alloy particles, an alkaline electrolyte solution, and a separator into the battery. The cathode can further include an oxidation-resistant, electrically-conductive carbon additive, such as synthetic, non-expanded oxidation-resistant graphite, graphitized carbon black, vapor phase grown carbon fibers, and/or carbon nanofibers. In some embodiments, the carbon additive is included in the cathode at a level of between 3% and 20% (e.g., between 3% and 10%) of the total cathode weight.

Embodiments of the methods may include one or more of the following advantages.

The acid-treatment step can be relatively easily integrated into a cathode active material's manufacturing process. In some embodiments, acid-treatment of a layered nickel (IV)-containing cathode active material can reduce metallic impurities (e.g., Cr, Fe, Cu) in the layered nickel (IV)-containing cathode active material and can lead to decreasing costs in battery production, as a less pure cathode active material can be treated relatively cheaply to provide a high purity cathode active material. In addition, the acid-treatment can be amenable to large scale manufacturing conditions.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference symbols in the various drawings indicate like elements.

DETAILED DESCRIPTION OF THE INVENTION

Figure 1:
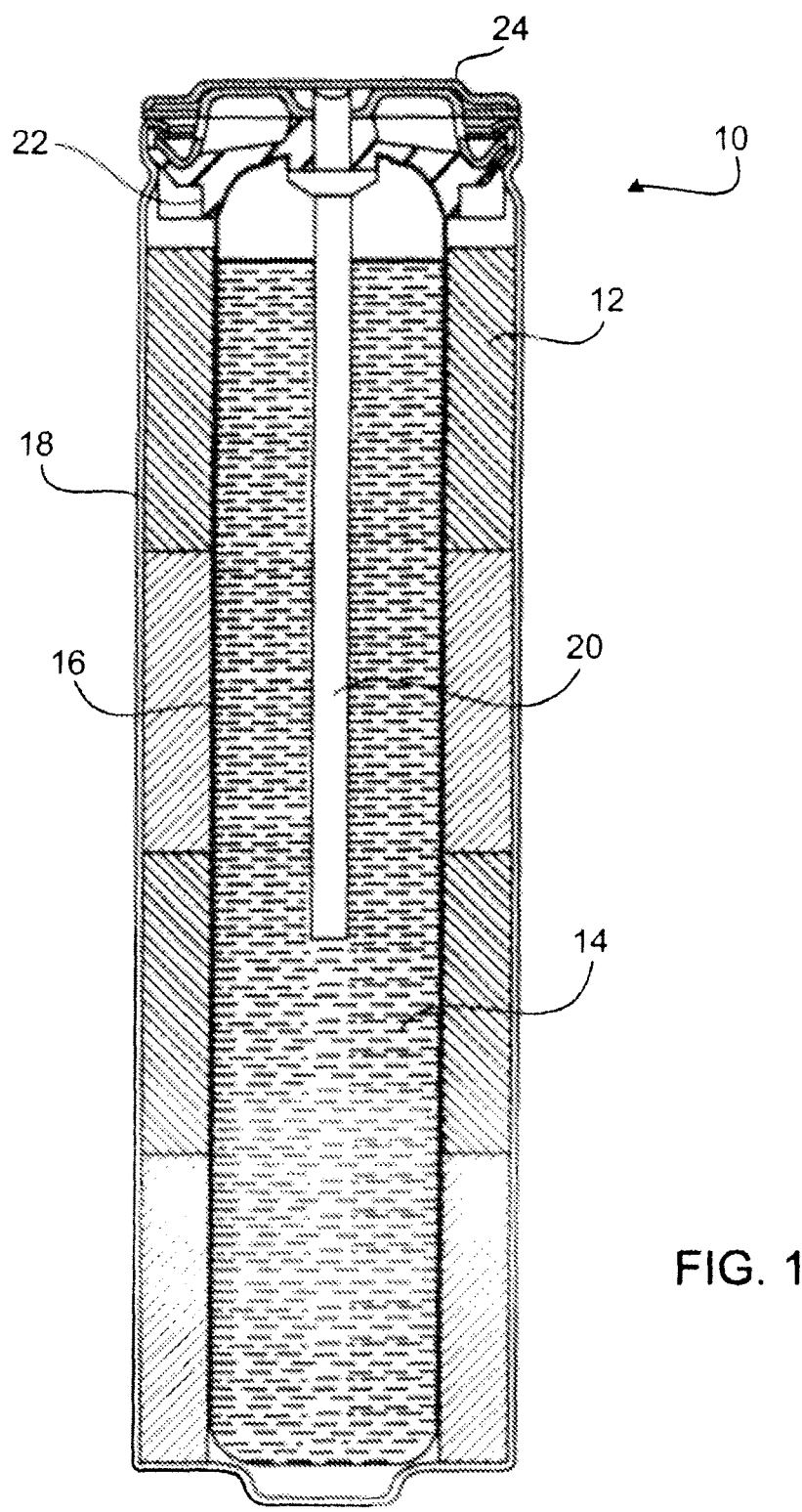
FIG. 1 is a schematic side sectional view of an alkaline primary round cell/battery.

Referring to FIG. 1, a battery 10 includes a cylindrical housing 18, a cathode 12 in the housing, an anode 14 in the housing, and a separator 16 between the cathode and the anode. Battery 10 also includes a current collector 20, a seal 22, and a metal top cap 24, which serves as the negative terminal for the battery. Cathode 12 is in contact with housing 18, and the positive terminal of battery 10 is at the opposite end of battery 10 from the negative terminal. An electrolyte solution, e.g., an alkaline solution, is dispersed throughout battery 10.

Cathode 12 can include an electrochemically active material having a doped alkali-deficient nickel oxide that optionally includes protons, an electrically conductive additive, and optionally a binder.

An undoped alkali-deficient nickel oxide can be an alkali-deficient nickel oxide having a generic formula $A_xNiO_2$, where "A" is an alkali metal ion, and x is less than 1 (e.g., $0 \leq x \leq 0.2$). In some embodiments, x is between about 0.06 and 0.07. In some embodiments, x is as small as possible to maximize an amount of Ni(IV) in a given alkali-deficient nickel oxide. The undoped alkali-deficient nickel oxide can have a deficiency of alkali metals compared to a nominally stoichiometric compound having a generic formula of $ANiO_2$. The alkali-deficient nickel oxide can contain defects in the crystal lattice, for example, in the case where the alkali metal has deintercalated or leached out of the crystal lattice. In some embodiments, Ni ions can partially occupy interlayer alkali metal sites in the crystal lattice. In some embodiments, Ni ions can be partially absent from nickel sites in the crystal lattice, thereby creating vacancies at nickel sites. In some embodiments, the alkali metal includes Li, Na, K, Cs, and/or Rb.

In some embodiments, the alkali-deficient nickel oxide can be doped with a dopant metal, such as Co, Mg, Al, Ca, Mn, and/or Y. The metal-doped alkali-deficient nickel oxide can have a general formula of $A_xNi_{1-y-z}Co_yM^a_zO_2$, where A is an alkali metal, $M^a$ is a dopant metal such as Mg, Al, Ca, Mn, and/or Y, $0 \leq x \leq 0.15$, and $0.02 \leq y+z < 0.25$. $M^a$ can be a single metal or a mixture of metals. In the metal-doped alkali-deficient nickel oxide, Co can be present or absent, and Mg, Al, Ca, Mn, and/or Y can be present or absent; provided that at least one of Co, or an element selected from Mg, Al, Ca, Mn, and/or Y is present in the alkali-deficient metal-doped nickel oxide. For example, the metal-doped alkali-deficient nickel oxide can have a nominal formula $Li_{0.12}Ni_{0.92}Co_{0.08}O_2$. In some embodiments, the metal-doped alkali-deficient nickel oxide can have a formula of $Li_xNi_{1-y}Co_yO_2$, $Li_xNi_{1-z}Mg_zO_2$, $Li_xNi_{1-y-z}Co_yMg_zO_2$, $Li_xNi_{1-z}Al_zO_2$, $Li_xNi_{1-y-z}Co_yAl_zO_2$, $Li_xNi_{1-z}(Mg, Al)_zO_2$, $Li_xNi_{1-y-z}Co_y(Mg, Al)_zO_2$, $Li_xNi_{1-z}Ca_zO_2$, $Li_xNi_{1-y-z}Co_yCa_zO_2$, $Li_xNi_{1-z}Y_zO_2$, $Li_xNi_{1-y-z}Co_yY_zO_2$, $Li_xNi_{1-z}Mn_zO_2$ or $Li_xNi_{1-y-z}Co_yMn_zO_2$. The metal dopant (e.g., Co, Mg, Al, Ca, Mn, and/or Y) can substitute for Ni ions and/or partially substitute for alkali metal ions in the alkali metal sites between the nickel oxygen layers in the nickel oxide crystal lattice.

In some embodiments, the alkali-deficient nickel oxide can be doped with both a non-metal dopant, such as boron (B), silicon (Si) or germanium (Ge) and a metal dopant, such as Co, Mg, Al, Ca, Mn, and/or Y. The metal and non-metal doped alkali-deficient nickel oxide can have a general formula of $A_xNi_{1-y-z-w}Co_yM^a_zM^b_wO_2$, where A is an alkali metal, $M^a$ is a metal dopant such as Mg, Al, Ca, Mn, and/or Y, $0 \leq x \leq 0.2$, and $0.02 \leq y+z \leq 0.25$, and $M^b$ is a non-metal dopant such as B, Si, and/Ge and $0 \leq w \leq 0.02$. In some embodiments, x<1 and (y+z)<0.2; or x<1, $0.01 \leq y \leq 0.2$, and $0.01 \leq z \leq 0.2$. For example, a combination of metal and non-metal doped alkali-deficient nickel oxide can have a formula of $Li_{0.1}Ni_{0.79}Co_{0.15}Al_{0.05}B_{0.01}O_2$.

In some embodiments, in a doped alkali-deficient nickel oxide having a formula of $A_xNi_{1-y-z}Co_yM^a_zO_2$ or $A_xNi_{1-y-z-w}Co_yM^a_zM^b_wO_2$, x is less than or equal to 0.2 (e.g., less than or equal to 0.15, less than or equal to 0.12, less than or equal to 0.1, less than or equal to 0.08, less than or equal to 0.05, or less than or equal to 0.03) and/or greater than or equal to 0 (e.g., greater than or equal to 0.03, greater than or equal to 0.05, greater than or equal 0.08, greater than or equal to 0.1, greater than or equal to 0.12, or greater than or equal to 0.15). In some embodiments, to enhance discharge performance, x is less than 0.3. In some embodiments, at least one of y or z is greater than 0. As an example, y+z is greater than 0 (e.g., greater than or equal to 0.02, greater than or equal to 0.04, greater than or equal to 0.08, greater than or equal to 0.1, greater than or equal to 0.15, greater than or equal to 0.2, or greater than or equal to 0.22) and/or less than or equal to 0.25 (e.g., less than or equal to 0.22, less than or equal to 0.2, less than or equal to 0.15, less than or equal to 0.1, less than or equal to 0.08, less than or equal to 0.04, or less than or equal to 0.02). In some embodiments, y is greater than or equal to 0 (e.g., greater than or equal to 0.02, greater than or equal to 0.04, greater than or equal to 0.08, greater than or equal to 0.1, greater than or equal to 0.12) and/or less than or equal to 0.2 (e.g., less than or equal to 0.15, less than or equal to 0.12, less than or equal to 0.1, less than or equal to 0.08, or less than or equal to 0.04). In some embodiments, z is greater than or equal to 0 (e.g., greater than or equal to 0.02, greater than or equal to 0.03, greater than or equal to 0.04, greater than or equal to 0.05, greater than or equal to 0.06, or greater than or equal to 0.07) and/or less than or equal to 0.1 (e.g., less than or equal to 0.08, less than or equal to 0.07, less than or equal to 0.06, less than or equal to 0.05, less than or equal to 0.04, or less than or equal to 0.03). In some embodiments, w is greater than or equal to 0 (e.g., greater than or equal to 0.005, greater than or equal to 0.01, or greater than or equal to 0.015) and/or less than or equal to 0.02 (less than or equal to 0.015, less than or equal to 0.01, or less than or equal to 0.005).

In some embodiments, when a doped alkali-deficient nickel oxide has three dopants (e.g., two metal dopants and a non-metal dopant, two non-metal dopants and a metal dopant, three metal dopants, three non-metal dopants), the ratio for the three dopants can be, for example, 1:1:1; 2:1:1; 2:2:1; 3:1:1; 3:2:1; 4:1:1; 4:3:3; 5:1:1; 5:2:1; 5:3:2; 5:4:1; or 6:3:1. As an example, a $Co:M^b_1:M^b_2$ ratio can be 1:1:1; 2:1:1; 2:2:1; 3:1:1; 3:2:1; 4:1:1; 4:3:3; 5:1:1; 5:2:1; 5:3:2; 5:4:1; or 6:3:1.

The nickel in an alkali-deficient nickel oxide can have multiple oxidation states. For example, the nickel can have an average positive oxidation state of greater than 3 (e.g., greater than 3.25, greater than 3.5, or greater than 3.8) and/or less than or equal to 4 (less than 3.8, less than 3.5, less than 3.25, or less than 3.2). The nickel of the alkali-deficient nickel oxide can have a higher average oxidation state than the nickel in a corresponding stoichiometric precursor alkali nickel oxide, prior to removal of alkali metal cation A. In some embodiments, the average oxidation state of the nickel in the alkali-deficient nickel oxide can be 0.3 greater (e.g., 0.5 greater, 0.8 greater, or 0.9 greater) than the average oxidation state of the nickel in the corresponding stoichiometric precursor alkali nickel oxide.

The alkali-deficient nickel oxide including nickel having an average positive oxidation state of greater than 3, can have a layered structure; a spinel-type structure or can include a physical mixture or composite of layered and spinel-type structures, as well as other related crystal structures. As an example, a lithium deficient nickel (IV) oxide, $Li_xNiO_2$ prepared by delithiation of a layered $LiNiO_2$ can have either a layered structure related to that of the layered precursor $LiNiO_2$ or a spinel-type structure, depending on the stoichiometry and/or heat treatment conditions. In some embodiments, the alkali-deficient nickel oxides can have a layered crystal structure with alkali metal ions located in interlayer lattice sites between the nickel-oxygen layers. The alkali-deficient nickel oxides can have defects where alkali metal ions have been extracted. In some embodiments, the alkali metal ions can be partially replaced by protons in the crystal lattice. The interlayer spacing distance can be either maintained or changed after oxidative de-intercalation of alkali metal ions, intercalation of protons, and/or alkali metal ion/proton exchange. In some embodiments, the interlayer spacing can increase due to substitution by alkali ions having larger ionic radii. For example, the interlayer spacing can increase when Li ions are substituted by larger potassium (K) ions, anion, and/or water molecules. In some embodiments, the interlayer spacing in alkali-deficient nickel oxides can increase due to increased electrostatic repulsion between the oxygen-containing layers after alkali ion removal.

The metal-doped, non-metal doped, and undoped alkali-deficient nickel oxides can be characterized by measurement of their x-ray powder diffraction patterns, elemental compositions, and average particle sizes. In some embodiments, crystal lattice parameters of doped or undoped alkali-deficient nickel oxide and corresponding stoichiometric precursors can be determined from powder X-ray diffraction ("XRD") patterns. For example, X-ray powder diffraction patterns can be measured with an X-ray diffractometer (e.g., Bruker D-8 Advance X-ray diffractometer, Rigaku Miniflex diffractometer) using Cu $K_\alpha$ or Cr $K_\alpha$ radiation by standard methods described, for example, by B. D. Cullity and S. R. Stock (*Elements of X-ray Diffraction*, $3^{rd}$ ed., New York: Prentice Hall, 2001). The unit cell parameters can be determined by Rietveld refinement of the powder diffraction data. The X-ray crystallite size also can be determined by analysis of peak broadening in a powder diffraction pattern of a sample containing an internal Si standard using the single-peak Scherrer method or the Warren-Averbach method as discussed in detail, for example, by H. P. Klug and L. E. Alexander (*X-ray Diffraction Procedures for Polycrystalline and Amorphous Materials*, New York: Wiley, 1974, 618-694). In some embodiments, a layered, metal-doped lithium-deficient nickel oxide can have a formula of $Li_xNi_{1-y-z}Co_yM^a_zO_2$ or $Li_xNi_{1-y-z-w}Co_yM^a_zM^b_wO_2$ can have an X-ray diffraction pattern indicating that interlayer spacing has changed relatively little compared to undoped $LiNiO_2$. For example, the 003 Miller index line at the approximate diffraction angle of $2\theta=18.79°$ can remain almost at the same angle while other Miller index (e.g., hk0) lines can show a larger shift, indicating a relatively minor change in the a and/or b unit cell parameters axis of the lattice. The extent of structural distortion also can depend on the average nickel oxidation state, the site occupancy of the lithium ions and protons, as well as total lithium ion/proton content.

In some embodiments, the mean particle size and size distribution for a alkali-deficient nickel oxide and the corresponding precursor alkali nickel oxide can be determined with a laser diffraction particle size analyzer (e.g., a SympaTec Helos particle size analyzer equipped with a Rodos dry powder dispersing unit) using algorithms based on Fraunhofer or Mie theory to compute the volume distribution of particle sizes and mean particle sizes. Particle size distribution and volume distribution calculations are described, for example, in M. Puckhaber and S. Rothele (Powder Handling & Processing, 1999, 11(1), 91-95 and European Cement Magazine, 2000, 18-21). In some embodiments, the alkali nickel oxide precursor can include an agglomerate or a sintered aggregate (i.e., secondary particles) composed of much smaller primary particles. Such agglomerates and aggregates are readily measured using the particle size analyzer. In some embodiments, scanning electron microscopy ("SEM") can be used to determine the morphology and average particle sizes of particles of a nickel oxide.

In some embodiments, the content of the nickel, metal dopants, non-metal dopants, and alkali metals in doped and undoped alkali-deficient nickel oxides can be determined by, for example, inductively coupled plasma atomic emission spectroscopy ("ICP-AE") and/or atomic absorption spectroscopy ("AA") using standard methods as described, for example, by J. R. Dean (*Practical Inductively Coupled Plasma Spectroscopy*, Chichester, England: Wiley, 2005, 65-87) and B. Welz and M. B. Sperling (*Atomic Absorption Spectrometry*, $3^{rd}$ ed., Weinheim, Germany: Wiley VCH, 1999, 221-294). For example, ICP-AE spectroscopy measurements can be performed using a Thermo Electron Corporation IRIS intrepid II XSP ICP with Cetac ASX-510 autosampler attachment. For some nickel oxide samples including lithium and nickel, ICP-AE analysis can be performed separately for Li ($\lambda=670.784$ nm), Co ($\lambda=228.616$ nm) and Ni ($\lambda=221.647$ nm). Analysis of doped or undoped alkali-deficient nickel oxide samples for metals can be performed by a commercial analytical laboratory, for example, Galbraith Laboratories, Inc. (Knoxville, Tenn.). Proton content can be analyzed using a type of neutron activation analysis known as "PGAA (Prompt Gamma-ray Activation Analysis) at University of Texas—Austin using the general methods described, for example, by G. L. Molnar (*Handbook of Prompt Gamma Activation Analysis*, Dordrecht, The Netherlands: Kluwer Academic Publishers, 2004). The average oxidation state of the nickel and the transition metals dopants (e.g., Mn, Co) in lithium deficient metal-doped the nickel oxide can be determined by chemical titrimetry using ferrous ammonium sulfate and standardized potassium permanganate solutions as described, for example, by A. E Dagget and W. B. Meldrun (Quantitative Analysis, Boston: Heath, 1955, 408-9). The average oxidation state of the transition metals also can be determined indirectly from the specific gravimetric capacity observed for coin cells including the lithium deficient metal-doped nickel oxide as the cathode active material, Li metal as the anode active material, and a non-aqueous electrolyte solution.

Elemental analyses of selected compositions of doped and undoped alkali nickel oxide powders were performed. Samples can be measured using inductively coupled plasma atomic emission spectroscopy ("ICP-AE") by a commercial analytical laboratory (e.g., Galbraith Laboratories, Inc., Knoxville, Tenn).

True densities of an alkali-deficient nickel oxide and the corresponding precursor nickel oxide can be measured by a He gas pycnometer (e.g., Quantachrome Ultrapyc Model 1200e) as described in general by P. A. Webb ("Volume and Density Determinations for Particle Technologists", Internal Report, Micromeritics Instrument Corp., 2001, pp. 8-9) and in, for example, ASTM Standard D5965-02 ("Standard Test Methods for Specific Gravity of Coating Powders", ASTM International, West Conshohocken, Pa., 2007) and ASTM Standard B923-02 ("Standard Test Method for Metal Powder Skeletal Density by Helium or Nitrogen Pycnometry", ASTM International, West Conshohocken, Pa., 2008). True density is defined, for example, by the British Standards Institute, as the mass of a particle divided by its volume, excluding open and closed pores.

Inclusion of a stabilized delithiated nickel oxide containing tetravalent nickel (i.e., Ni(IV)) in a cathode active material can improve overall discharge performance of primary alkaline batteries compared to batteries including conventional cathode active materials (e.g., electrolytic manganese dioxide (EMD) or β-nickel oxyhydroxide). In some embodiments, alkaline batteries with cathodes including Ni(IV)-containing active materials can exhibit an initial or "fresh" (i.e., measured within about 1 hour of cell closure) open circuit voltage (OCV) of greater than about 1.90 V and less than about 2.10 V. Without wishing to be bound by theory, it is believed that alkaline batteries with cathodes including nickel (IV)-containing active materials having a lower OCV (e.g., less than about 1.75 V, less than about 1.70 V) can be advantageous for use with certain battery-powered electronic devices, such as devices designed for use with standard commercial alkaline batteries. In some embodiments, alkaline batteries with cathodes including nickel (IV)-containing active materials can have adequate capacity retention after storage for longer than about 1-2 weeks at ambient room temperature (e.g., or at elevated temperatures such as 45° C. or 60° C.) for extended periods of time (e.g., for one week or longer, two weeks or longer, three weeks or longer), which can provide batteries with a useful shelf life.

In some embodiments, alkaline batteries with cathodes including alkali deficient metal-doped nickel (IV) oxide can have decreased internal gas pressure buildup during storage. Without wishing to be bound by theory, it is believed that the gradual buildup of gas pressure during storage can result from generation of oxygen gas due to degradation of the alkaline electrolyte, via oxidation of water by nickel (IV) at high OCV, as shown in Equation 1.

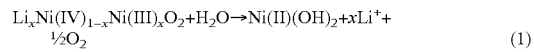

$$Li_xNi(IV)_{1-x}Ni(III)_xO_2+H_2O \rightarrow Ni(II)(OH)_2+xLi^+ + \tfrac{1}{2}O_2 \qquad (1)$$

In some embodiments, the metal doped alkali-deficient nickel oxide powder has a cumulative oxygen evolution volume after storing for three weeks at 25° C. in alkaline electrolyte solution of less than 5 cm$^3$/g (e.g., less than 6 cm$^3$/g, less than 7 cm$^3$/g,). In some embodiments, the corresponding value for undoped alkali-deficient nickel oxide powder is greater than 8.5 cm$^3$/g.

An increase in the internal gas pressure of a cell can be undesirable, as product safety can be compromised for the consumer. For example, an increase in internal pressure can cause the battery to leak and/or vent if the gas pressure becomes sufficiently high. In some embodiments, decreasing the initial OCV of alkaline primary batteries having cathodes including alkali deficient metal-doped nickel Ni(IV) oxide active materials can decrease oxygen generation, resulting in less pressure buildup during long term storage.

In some embodiments, the alkali-deficient metal-doped nickel oxide has a nominal low rate capacity of at least 350 mAh/g (e.g., at least 375 mAh/g) and a high rate capacity of at least 360 mAh/g after storing for 24 hours at 25° C. The doped alkali-deficient nickel oxide can have a low rate capacity of at least 340 mAh/g (e.g., at least 350 mAh/g, at least 360 mAh/g) after storing for one week at 25° C. The alkali-deficient metal-doped nickel oxide can have a nominal low rate capacity of at least 300 mAh/g (e.g., at least 310 mAh/g, at least 320 mAh/g, at least 330 mAh/g, at least 340 mAh/g) after storing for one week at 45° C.

In some embodiments, alkaline cells with cathodes including the doped alkali-deficient metal doped nickel oxide have a capacity retention of at least 90 percent (e.g., at least 95%) when discharged at a nominally low rate after storing for one week at 25° C. Alkaline cells with cathodes including the metal doped alkali-deficient nickel oxide can have a capacity retention of at least 80 percent (e.g., at least 85 percent) when discharged at a nominally low rate after storing for one week at 45° C.

In general, an alkali-deficient nickel oxide can be prepared by treatment of a layered lithium nickel oxide precursor having a nominal stoichiometric formula of LiNiO$_2$ with a 2-12M aqueous solution of a strong mineral acid (e.g., sulfuric acid, nitric acid, hydrochloric acid) at a temperature below ambient room temperature (e.g., below about 10° C., between about 0 and about 5° C.) for various periods of time ranging between 20 and 60 hours. Nearly all the lithium ions can be extracted from the interlayer regions between the nickel-oxygen layers in the crystal lattice. A suitable layered lithium nickel dioxide precursor having specific physicochemical properties can be synthesized from a commercial spherical nickel hydroxide by any of several methods including both high and low temperature processes. For example, a layered lithium nickel dioxide can be synthesized by procedures described by Ohzuku and co-workers (J. Electrochem. Soc., 1993, 140, 1862); Ebner and co-workers (Solid State Ionics, 1994, 69, 238); U.S. Pat. Nos. 4,980,080; 5,180,574; 5,629,110; and 5,264,201, each herein incorporated by reference in its entirety. A layered lithium nickel oxide precursor having at least a portion of the nickel ions substituted by one or more other metal ions or non-metal ions can be prepared, for example, via a solid state reaction of a mixture of suitable metal-containing precursor powders. For example, a powder can include particles having an average particle size of 5-200 microns, 10-100 microns, 20-50 microns, as described, for example, in U.S. Pat. No. 4,980,080, U.S. Pat. No. 5,629,110, U.S. Pat. No. 5,955,051, U.S. Pat. No. 5,720,932, U.S. Pat. No. 6,274,270, and U.S. Pat. No. 6,335,119, each herein incorporated by reference in its entirety. The metal ions can be a transition metal ions (e.g., Co, Mn, Y), alkaline earth metal ions (e.g., Ca, Mg) or main group metal ions (e.g., Al, Sn). Non-metal ions (e.g., B, Si, Ge) can be substituted for Ni ions and/or Li ions.

Figure 11:
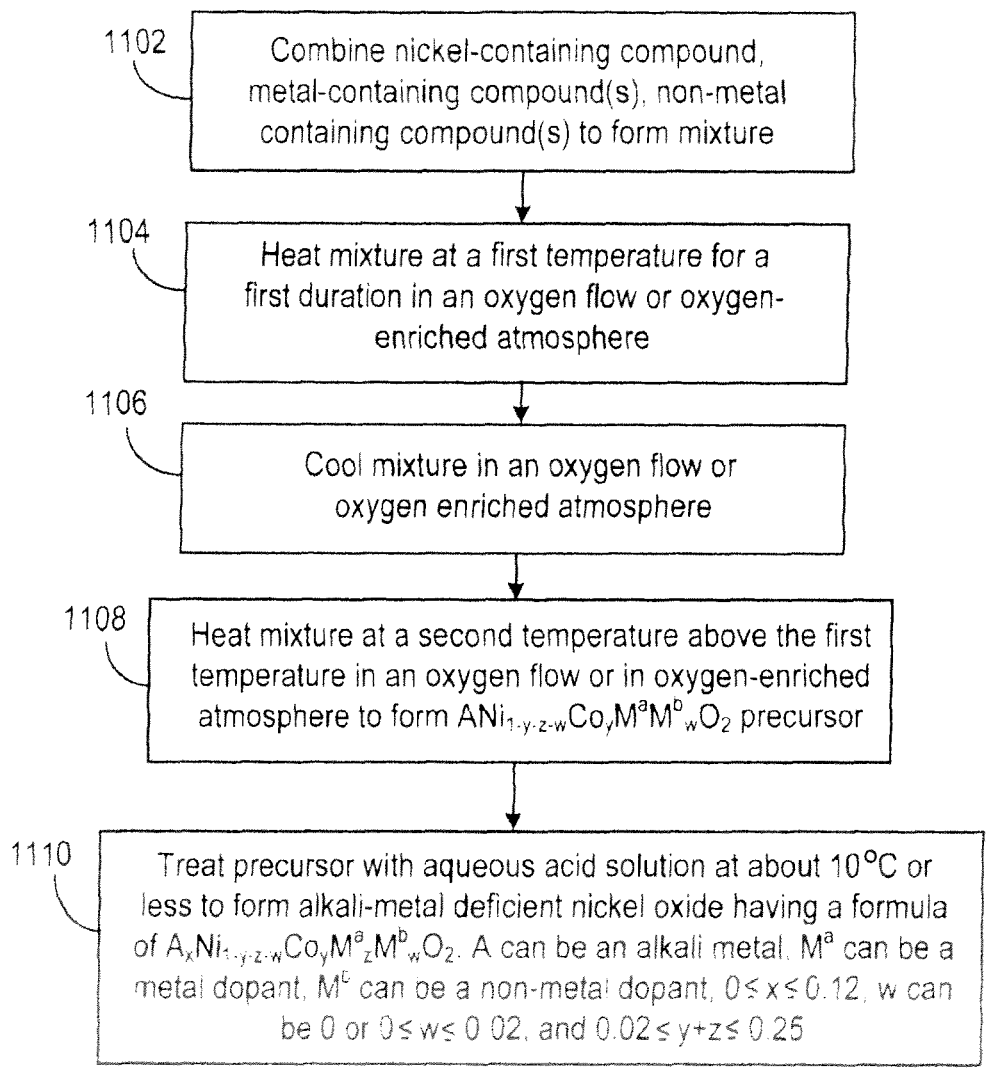
FIG. 11 is a flow chart showing an embodiment of a method of making an alkali deficient nickel (IV) oxide.

In some embodiments, referring to FIG. 11, to prepare an undoped layered lithium nickel oxide, an undoped nickel-containing precursor compound (e.g., nickel monoxide (NiO), nickel sesquioxide (Ni$_2$O$_3$), nickel hydroxide (Ni(OH)$_2$), nickel oxyhydroxide (NiOOH), nickel carbonate (NiCO$_3$), nickel nitrate (Ni(NO$_3$)$_2$)) can be combined (e.g., mixed) with a stoichiometric amount (i.e., nominally 1:1) of lithium hydroxide monohydrate (LiOH.H$_2$O) and/or lithium nitrate (LiNO$_3$) to form a mixture using a high-energy mixing process (e.g., a high-energy shaker mill, a planetary mill, a stirred ball mill, a small media mill). In some embodiments, metal and/or non-metal dopants can be combined with the mixture. The mixture can be heated sequentially at two different heat treatment temperatures in flowing oxygen gas or an oxygen-enriched atmosphere. Without wishing to be bound by theory, it is believed that at lower temperatures, gaseous H$_2$O and CO$_2$ can be driven off from the precursors, and at higher temperatures the solid state reaction to form the lithium nickel oxide can take place. For example, initially, the mixture can be heated slowly in an oxygen gas flow to between 185 and 225° C. (e.g., about 205° C., about 210° C., about 220° C.) at a nominal furnace ramp rate of about 0.5° C./minute, held at temperature (i.e., "soak") for 16 to 20 hours (e.g., about 18 hours), and then allowed to furnace cool (in an oxygen flow) to nearly ambient room temperature (e.g., 25-40° C.). Next, the mixture can be ground to breakup aggregates and to ensure homogeneity of the mixture; heated in a stepwise manner to between 775 and 850° C. (e.g., about 800° C.) with, for example, two intermediate temperature soaks. The first soak can be at about 150° C. (i.e., between 125 and 200° C.) for 0.5 to 1.5 hours (e.g., 1 hour), the second soak at about 300° C. (i.e., between 250 and 350° C.) for 2 to 6 hours (e.g., 3 hours). After the second soak, the mixture can be heated to between 775 and 850° C. (e.g., about 800° C.) and held at temperature 24 to 60 hours (e.g., 48 hours), and finally allowed to furnace cool (in an oxygen flow) to ambient room temperature.

In some embodiments, to prepare a multiply metal-doped lithium nickel oxide, an undoped nickel oxide (e.g., nickel hydroxide, nickel oxyhydroxide, nickel monoxide, nickel sesquioxide, nickel carbonate) and selected metal ion sources, for example, aluminum metal powder, aluminum hydroxide (e.g., $Al(OH)_3$), cobalt metal powder, cobalt oxide (e.g., $CoO$, $Co_3O_4$), cobalt hydroxide (e.g., $Co(OH)_2$), cobalt oxyhydroxide (CoOOH), cobalt carbonate (e.g., $CoCO_3$), cobalt nitrate ($Co(NO_3)_2$), magnesium metal powder, magnesium oxide (MgO), magnesium carbonate ($MgCO_3$), calcium oxide (e.g., CaO), calcium carbonate (e.g., $CaCO_3$), yttrium hydroxide ($Y(OH)_3$), yttrium oxide ($Y_2O_3$), manganese metal powder, manganese oxide (e.g., MnO, $Mn_2O_3$, $MnO_2$), manganese carbonate (e.g., $MnCO_3$), manganese nitrate ($Mn(NO_3)_2$), lithium hydroxide monohydrate, and/or lithium nitrate in specified stoichiometric ratios can be mixed by a high-energy milling process. Stoichiometries of the compositions can be selected according to composition diagrams corresponding to selected metal-doped lithium nickel oxide systems, for example, $LiNi_{1-y-z}Co_yMg_zO_2$ and $LiNi_{1-y-z}Co_yAl_zO_2$. The high-energy milled mixtures including nickel oxide (e.g., nickel oxyhydroxide, nickel hydroxide) and various metal ion sources serving as precursors to the metal-doped lithium nickel oxides can be heated as above for the undoped lithium nickel oxide.

In some embodiments, at least a portion of the Ni ions in a layered lithium nickel oxide precursor can be substituted by one or more non-metal ions (e.g., B, Si, Ge). A mixed metal and nonmetal-doped lithium nickel oxide can be prepared by blending a nickel oxide (e.g., nickel oxyhydroxide, nickel hydroxide) powder, selected metal sources, and selected nonmetal sources, for example, boron oxide ($B_2O_3$), silicon powder (Si), silicon dioxide ($SiO_2$), germanium powder (Ge), germanium dioxide ($GeO_2$) and lithium hydroxide monohydrate in specified stoichiometric ratios and thoroughly mixing by a high-energy milling process. The high-energy milled mixtures including the nickel oxide and the various nonmetal and metal sources can be heated as above for metal-doped lithium nickel oxides to prepare mixed nonmetal and metal-doped lithium nickel oxides.

In some embodiments, the metal-doped alkali nickel oxides can be prepared via a modified solid-state process. For example, the nickel source material can be a commercial spherical nickel oxyhydroxide powder that is either undoped, or where the nickel is partially substituted by other transition metals, for example, by about 2-5 atomic % cobalt (e.g., 3 at % Co) and/or 2-5 atomic % manganese. The nickel oxyhydroxide can be prepared by chemical oxidation of a commercial spherical β-nickel hydroxide as follows. An excess of a solid peroxydisulfate salt (e.g., sodium peroxydisulfate ($Na_2S_2O_8$), potassium peroxydisulfate ($K_2S_2O_8$), ammonium peroxydisulfate (($NH_4)_2S_2O_8$)) can be added in portions to a stirred slurry consisting of undoped (or cobalt-doped) β-nickel hydroxide powder suspended in de-ionized water at about 20-45° C. The mixture can then be heated to about 50-80° C. and stirred for about 12 to 20 hours with incremental addition of portions of aqueous NaOH solution or solid NaOH powder to maintain pH within a range of $8<pH<12$ (e.g., at about 10). Next, the stirring and heating can be stopped and the resulting suspension of black particles can be allowed to settle (e.g., 1-4 hours). A clear supernatant liquid can be removed and the particles can be re-suspended in a fresh aliquot of water (e.g., de-ionized water). This suspension can be stirred for 5-30 minutes, allowed to settle, the supernatant removed, and the entire process repeated until the pH of the supernatant is nearly neutral (e.g., $6<pH<8$, or about 7). The washed nickel oxyhydroxide product can be dried in air at about 80-100° C. In some cases, the nickel oxyhydroxide can be a γ-nickel oxyhydroxide or a mixture of β-nickel oxyhydroxide and γ-nickel oxyhydroxide.

In some embodiments, the nickel oxyhydroxide can be coated with a thin layer of cobalt oxyhydroxide (e.g., γ-CoOOH) by adding a soluble cobalt salt (e.g., cobalt sulfate ($CoSO_4 \cdot 6H_2O$), cobalt nitrate ($Co(NO_3)_2$)) to the nickel hydroxide slurry prior to addition of the peroxydisulfate oxidant. The cobalt oxyhydroxide-coated nickel oxyhydroxide product can include about 3-5 wt % of Co in the coated layer. In some embodiments, β-nickel hydroxide can be oxidized to form coated or uncoated β-nickel oxyhydroxide by treating a suspension of the nickel hydroxide powder in a stirred aqueous sodium hydroxide solution (e.g., 5N) with a concentrated (e.g., 15-30 wt %) solution of sodium hypochlorite and heating as above.

In some embodiments, preparation of nickel(IV)-containing cathode active materials requires removal of most of the interlayer Li ions from the layered lithium nickel oxide precursors. In some embodiments, the Li ions are chemically extracted via an oxidative delithiation process. Oxidative delithiation of a layered lithium nickel oxide can take place via a proton catalyzed aqueous disproportionation process such as that described in Equation 2 and as reported by H. Arai and coworkers (J. Solid State Chem., 2002, 163, 340-9). For example, treatment of a layered lithium nickel oxide powder with an aqueous 6M $H_2SO_4$ solution at very low pH can cause Ni(III) ions on the surfaces of the particles to disproportionate into equal numbers of Ni(II) and Ni(IV) ions.

$$2LiNi^{+3}O_2 + 4H^+ \rightarrow Ni^{+4}O_2 + Ni^{+2} + 2Li^+ + 2H_2O \quad (2)$$

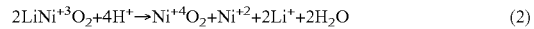

The Ni(II) ions can dissolve in the acid solution whereas the Ni(IV) ions are insoluble and can remain in the solid phase.

In some embodiments, ionic exchange of Li ions by protons can take place via hydrolysis such as described in Equation 3. However, the introduction of protons into lattice sites formerly occupied by Li ions in the interlayer region can be undesirable since these protons can remain in the lattice even after acid treatment, and inhibit the disproportionation reaction. Further, these protons can interfere with solid state diffusion of protons inserted during discharge of cells including the lithium deficient nickel oxide as active cathode material as well as limit total discharge capacity.

$$LiNi^{+3}O_2 + H_2O \rightarrow H_xLi_{(1-x)}Ni^{+3}O_2 + xLiOH \quad (3)$$

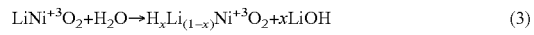

An improved process for oxidative delithiation of metal-substituted layered lithium nickel oxides by treatment with an aqueous solution of a mineral acid at a relatively low temperature (e.g., between 0° C. and 5° C.) was described, for example, in U.S. application Ser. No. 12/722,669. After treatment by the low-temperature acid washing process in U.S. application Ser. No. 12/722,669, the isolated solid product can exhibit a total weight loss of about 50% relative to the initial dry weight of the corresponding metal-substituted $LiNi_{1-y-z}Co_yM_zO_2$ phase. This weight loss can be attributed to, for example, the partial dissolution of Ni(II) ions as well as the extraction of $Li^+$ ions. Dissolution of $Ni^{+2}$ ions from the surface of the lithium nickel oxide particles can increase particle porosity thereby increasing exposure of $Ni^{+3}$ ions inside the particles to acid and resulting additional disproportionation. An increase in the amount of disproportionation can serve to raise the average Ni oxidation state. In some embodiments, the alkali-deficient nickel oxide is prepared as described, for example, in U.S. application Ser. No. 12/722,669, herein incorporated by reference in its entirety.

In some embodiments, the alkali-deficient nickel oxide includes protons. For example, the alkali-deficient nickel oxide can include protons at a stoichiometric ratio of between 0.01 and 0.2 atomic percent.

X-ray powder diffraction patterns of selected compositions of delithiated metal substituted nickel oxide powders can be measured in the same manner as the corresponding metal substituted lithium nickel oxides. The observed patterns can be consistent with those reported previously, for example, by H. Arai et al. (e.g., J. Solid State Chem., 2002, 163, 340-9) and also L. Croguennec et al. (e.g., J. Mater. Chem., 2001, 11, 131-41) for other chemically delithiated layered nickel oxides having various compositions. The experimental patterns can be consistent with that reported by T. Ohzuku et al. (e.g., J. Electrochem. Soc., 1993, 140, 1862) for a comparable sample of delithiated nickel oxide.

The alkali-deficient nickel oxide resulting from repeated acid treatment can have greater purity, greater B.E.T. specific surface area, and/or larger average pore diameter relative to the alkali metal-containing precursor nickel oxide. The specific surface areas of an alkali-deficient nickel oxide and the corresponding precursor nickel oxide can be determined by the multipoint B.E.T. $N_2$ adsorption isotherm method described, for example, by P. W. Atkins (*Physical Chemistry*, $5^{th}$ edn., New York: W. H. Freeman & Co., 1994, pp. 990-992) and S. Lowell et al. (*Characterization of Porous Solids and Powders: Powder Surface Area and Porosity*, Dordrecht, The Netherlands: Springer, 2006, pp. 58-80). The B.E.T. surface area method measures the total surface area on the exterior surfaces of particles and includes that portion of the surface area defined by open pores within the particle accessible for gas adsorption and desorption. In some embodiments, the specific surface area of the alkali-deficient nickel oxide can be substantially greater than that of the precursor nickel oxide. An increase in specific surface area can be correlated with an increase in surface roughness and porosity, which also can be assessed by analyzing the microstructure of the nickel oxide particles as imaged by scanning electron microscopy (e.g., SEM micrographs at about 10,000× magnification). Porosimetric measurements can be performed on the nickel oxide powders to determine cumulative pore volumes, average pore sizes (i.e., diameters), and pore size distributions. Pore sizes and pore size distributions can be calculated by applying various models and computational methods (e.g., BJH, DH, DR, HK, SF, etc.) to analyze the data from the measurement of $N_2$ adsorption and/or desorption isotherms, as discussed, for example, by S. Lowell et al. (*Characterization of Porous Solids and Powders: Powder Surface Area and Porosity*, Dordrecht, The Netherlands: Springer, 2006, pp. 101-156).

In some embodiments, cathode 12 can include between 50 percent and 95 percent by weight (e.g., between 60 percent and 90 percent by weight, between 70 percent and 85 percent by weight) of the cathode active material. Cathode 12 can include greater than or equal to 50, 60, 70, 80, or 90 percent by weight, and/or less than or equal to 95, 90, 80, 70, or 60 percent by weight of the cathode active material. Cathode 12 can include one or more (e.g., two, three or more) doped and/or undoped alkali-deficient nickel oxides, in any combination. For example, cathode 12 can include a mixture of $Li_xNi_{1-y}Co_yO_2$, $Li_xNi_{1-y-z}Co_yM^a_zO_2$, $Li_xNi_{1-y-z-w}Co_yM^a_zM^b_wO_2$, and/or $Li_xNiO_2$, where $M^a$ is Al, Mg, Ca, Mn, and/or Y.

One or more alkali-deficient nickel oxides can make up all of the active material of cathode 12, or a portion of the active material of cathode 12. In a cathode including a mixture or blend of active materials, the active materials can include greater than about one percent to less than about 100 percent by weight of the alkali-deficient nickel oxide. For example, cathode 12 can include greater than 0%, 1%, 5%, 10%, 20%, 50%, or 70% by weight of the alkali-deficient nickel oxide (s); and/or less than or equal to about 100%, 70%, 50%, 20%, 10%, 5%, or 1% by weight of the alkali-deficient nickel oxide(s). Other examples of suitable cathode active materials that can be used in combination with the alkali-deficient nickel oxide(s) can be selected from $\gamma$-$MnO_2$ (e.g., EMD, CMD), $\beta$-NiOOH, $\gamma$-NiOOH, AgO, $Ag_2O$, $AgNiO_2$, $AgCoO_2$, $AgCo_xNi_{1-x}O_2$, $AgCuO_2$, $Ag_2Cu_2O_3$, and combinations thereof.

In some embodiments, cathode 12 can include an electrically conductive additive capable of enhancing the bulk electrical conductivity of cathode 12. Examples of conductive additives include graphite, carbon black, silver powder, gold powder, nickel powder, carbon fibers, carbon nanofibers, carbon nanotubes, acetylene black, manganese dioxide, cobalt oxide, cobalt oxyhydroxide, silver oxide, silver nickel oxide, nickel oxyhydroxide, and indium oxide. Preferred conductive additives include graphite particles, graphitized carbon black particles, carbon nanofibers, vapor phase grown carbon fibers, and single and multiwall carbon nanotubes. In certain embodiments, the graphite particles can be non-synthetic (i.e., "natural"), nonexpanded graphite particles, for example, NdG MP-0702X available from Nacional de Grafite (Itapecirica, Brazil) and FormulaBT™ grade available from Superior Graphite Co. (Chicago, Ill.). In other embodiments, the graphite particles can be expanded natural or synthetic graphite particles, for example, Timrex® BNB90 available from Timcal, Ltd. (Bodio, Switzerland), WH20 or WH20A grade from Chuetsu Graphite Works Co., Ltd. (Osaka, Japan), and ABG grade available from Superior Graphite Co. (Chicago, Ill.). In yet other embodiments, the graphite particles can be synthetic, non-expanded graphite particles, for example, Timrex® KS4, KS6, KS15, MX15 available from Timcal, Ltd. (Bodio, Switzerland). The graphite particles can be oxidation-resistant synthetic, non-expanded graphite particles. The term "oxidation resistant graphite" as used herein refers to a synthetic graphite made from high purity carbon or carbonaceous materials having a highly crystalline structure. Suitable oxidation resistant graphites include, for example, SFG4, SFG6, SFG10, SFG15 available from Timcal, Ltd., (Bodio, Switzerland). The use of oxidation resistant graphite in blends with another strongly oxidizing cathode active material, nickel oxyhydroxide, is disclosed in commonly assigned U.S. Ser. No. 11/820,781, filed Jun. 20, 2007. Carbon nanofibers are described, for example, in commonly-assigned U.S. Pat. No. 6,858,349 and U.S. Patent Application Publication No. 2002-0172867A1. Cathode 12 can include between 3% and 35%, between 4% and 20%, between 5% and 10%, or between 6% and 8% by weight of conductive additive.

An optional binder can be added to cathode 12 to enhance structural integrity. Examples of binders include polymers such as polyethylene powders, polypropylene powders, polyacrylamides, and various fluorocarbon resins, for example polyvinylidene difluoride (PVDF) and polytetrafluoroethylene (PTFE). An example of a suitable polyethylene binder is available from Dupont Polymer Powders (Sàrl, Switzerland) under the tradename Coathylene HX1681. The cathode 12 can include, for example, from 0.05% to 5% or from 0.1% to 2% by weight binder relative to the total weight of the cathode. Cathode 12 can also include other optional additives.

The electrolyte solution also is dispersed throughout cathode 12, e.g., at about 5-7 percent by weight. Weight percentages provided above and below are determined after the electrolyte solution was dispersed in cathode 12. The electrolyte solution can be any of the electrolyte solutions commonly used in alkaline batteries. The electrolyte solution can be an alkaline solution, such as an aqueous alkali metal hydroxide solution, e.g., LiOH, NaOH, KOH, or mixtures of alkali metal hydroxide solutions (e.g., KOH and NaOH, KOH and LiOH). For example, the aqueous alkali metal hydroxide solution can include between about 33 and about 45 percent by weight of the alkali metal hydroxide, such as about 9 N KOH (i.e., about 37% by weight KOH). In some embodiments, the electrolyte solution also can include up to about 6 percent by weight zinc oxide, e.g., about 2 percent by weight zinc oxide.

Anode 14 can be formed of any of the zinc-based materials conventionally used in alkaline battery zinc anodes. For example, anode 14 can be a gelled zinc anode that includes zinc metal particles and/or zinc alloy particles, a gelling agent, and minor amounts of additives, such as a gassing inhibitor. A portion of the electrolyte solution can be dispersed throughout the anode. The zinc particles can be any of the zinc-based particles conventionally used in gelled zinc anodes. The zinc-based particles can be formed of a zinc-based material, for example, zinc or a zinc alloy. Generally, a zinc-based particle formed of a zinc-alloy is greater than 75% zinc by weight, generally greater than 99.9% by weight zinc. The zinc alloy can include zinc (Zn) and at least one of the following elements: indium (In), bismuth (Bi), aluminum (Al), calcium (Ca), gallium (Ga), lithium (Li), magnesium (Mg), and tin (Sn). The zinc alloy generally is composed primarily of zinc and preferably can include metals that can inhibit gassing, such as indium, bismuth, aluminum and mixtures thereof. As used herein, gassing refers to the evolution of hydrogen gas resulting from a reaction of zinc metal or zinc alloy with the electrolyte. The presence of hydrogen gas inside a sealed battery is undesirable because a pressure buildup can cause leakage of electrolyte. Preferred zinc-based particles are both essentially mercury-free and lead-free. Examples of zinc-based particles include those described in U.S. Pat. Nos. 6,284,410; 6,472,103; 6,521,378; and commonly-assigned U.S. application Ser. No. 11/001,693, filed Dec. 1, 2004, all hereby incorporated by reference. The terms "zinc", "zinc powder", or "zinc-based particle" as used herein shall be understood to include zinc alloy powder having a high relative concentration of zinc and as such functions electrochemically essentially as pure zinc. The anode can include, for example, between about 60% and about 80%, between about 62% and 75%, between about 63% and about 72%, or between about 67% and about 71% by weight of zinc-based particles. For example, the anode can include less than about 72%, about 70%, about 68%, about 64%, or about 60%, by weight zinc-based particles.

The zinc-based particles can be formed by various spun or air blown processes. The zinc-based particles can be spherical or non-spherical in shape. Non-spherical particles can be acicular in shape (i.e., having a length along a major axis at least two times a length along a minor axis) or flake-like in shape (i.e., having a thickness not more than 20% of the length of the maximum linear dimension). The surfaces of the zinc-based particles can be smooth or rough. As used herein, a "zinc-based particle" refers to a single or primary particle of a zinc-based material rather than an agglomeration or aggregation of more than one particle. A percentage of the zinc-based particles can be zinc fines. As used herein, zinc fines include zinc-based particles small enough to pass through a sieve of 200 mesh size (i.e., a sieve having a Tyler standard mesh size corresponding to a U.S. Standard sieve having square openings of 0.075 mm on a side) during a normal sieving operation (i.e., with the sieve shaken manually). Zinc fines capable of passing through a 200 mesh sieve can have a mean average particle size from about 1 to 75 microns, for example, about 75 microns. The percentage of zinc fines (i.e., −200 mesh) can make up about 10 percent, 25 percent, 50 percent, 75 percent, 80 percent, 90 percent, 95 percent, 99 percent or 100 percent by weight of the total zinc-based particles. A percentage of the zinc-based particles can be zinc dust small enough to pass through a 325 mesh size sieve (i.e., a sieve having a Tyler standard mesh size corresponding to a U.S. Standard sieve having square openings of 0.045 mm on a side) during a normal sieving operation. Zinc dust capable of passing through a 325 mesh sieve can have a mean average particle size from about 1 to 35 microns (for example, about 35 microns). The percentage of zinc dust can make up about 10 percent, 25 percent, 50 percent, 75 percent, 80 percent, 90 percent, 95 percent, 99 percent or 100 percent by weight of the total zinc-based particles. Even very small amounts of zinc fines, for example, at least about 5 weight percent, or at least about 1 weight percent of the total zinc-based particles can have a beneficial effect on anode performance. The total zinc-based particles in the anode can consist of only zinc fines, of no zinc fines, or mixtures of zinc fines and dust (e.g., from about 35 to about 75 weight percent) along with larger size (e.g., −20 to +200 mesh) zinc-based particles. A mixture of zinc-based particles can provide good overall performance with respect to rate capability of the anode for a broad spectrum of discharge rate requirements as well as provide good storage characteristics. To improve performance at high discharge rates after storage, a substantial percentage of zinc fines and/or zinc dust can be included in the anode.

Anode 14 can include gelling agents, for example, a high molecular weight polymer that can provide a network to suspend the zinc particles in the electrolyte. Examples of gelling agents include polyacrylic acids, grafted starch materials, salts of polyacrylic acids, polyacrylates, carboxymethylcellulose, a salt of a carboxymethylcellulose (e.g., sodium carboxymethylcellulose) or combinations thereof. Examples of polyacrylic acids include Carbopol 940 and 934 available from B.F. Goodrich Corp. and Polygel 4P available from 3V. An example of a grafted starch material is Waterlock A221 or A220 available from Grain Processing Corp. (Muscatine, Iowa). An example of a salt of a polyacrylic acid is Alcosorb G1 available from Ciba Specialties. The anode can include, for example, between about 0.05% and 2% by weight or between about 0.1% and 1% by weight of the gelling agent by weight.

Gassing inhibitors can include a metal, such as bismuth, tin, indium, aluminum or a mixture or alloys thereof. A gassing inhibitor also can include an inorganic compound, such as a metal salt, for example, an indium or bismuth salt (e.g., indium sulfate, indium chloride, bismuth nitrate). Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Separator 16 can have any of the conventional designs for primary alkaline battery separators. In some embodiments, separator 16 can be formed of two layers of a non-woven, non-membrane material with one layer being disposed along a surface of the other. To minimize the volume of separator 16 while providing an efficient battery, each layer of non-woven, non-membrane material can have a basic weight of about 54 grams per square meter, a thickness of about 5.4 mils when dry and a thickness of about 10 mils when wet. In these embodiments, the separator preferably does not include a layer of membrane material or a layer of adhesive between the non-woven, non-membrane layers. Generally, the layers can be substantially devoid of fillers, such as inorganic particles. In some embodiments, the separator can include inorganic particles. In other embodiments, separator 16 can include a layer of cellophane combined with a layer of non-woven material. The separator optionally can include an additional layer of non-woven material. The cellophane layer can be adjacent to cathode 12. Preferably, the non-woven material can contain from about 78% to 82% by weight polyvinyl alcohol (PVA) and from about 18% to 22% by weight rayon and a trace amount of surfactant. Such non-woven materials are available from PDM under the tradename PA25. An example of a separator including a layer of cellophane laminated to one or more layers of a non-woven material is Duralam DT225 available from Duracell Inc. (Aarschot, Belgium).

In yet other embodiments, separator 16 can be an ion-selective separator. An ion-selective separator can include a microporous membrane with an ion-selective polymeric coating. In some cases, such as in rechargeable alkaline manganese dioxide cells, diffusion of soluble zincate ion, i.e., $[Zn(OH)_4]^{2-}$, from the anode to the cathode can interfere with the reduction and oxidation of manganese dioxide, thereby resulting in a loss of coulombic efficiency and ultimately in decreased cycle life. Separators that can selectively inhibit the passage of zincate ions, while allowing free passage of hydroxide ions are described in U.S. Pat. Nos. 5,798,180 and 5,910,366. An example of a separator includes a polymeric substrate having a wettable cellulose acetate-coated polypropylene microporous membrane (e.g., Celgard® 3559, Celgard® 5550, Celgard® 2500, and the like) and an ion-selective coating applied to at least one surface of the substrate. Suitable ion-selective coatings include polyaromatic ethers (such as a sulfonated derivative of poly(2,6-dimethyl-1,4-phenyleneoxide)) having a finite number of recurring monomeric phenylene units each of which can be substituted with one or more lower alkyl or phenyl groups and a sulfonic acid or carboxylic acid group. In addition to preventing migration of zincate ions to the manganese dioxide cathode, the selective separator was described in U.S. Pat. Nos. 5,798,180 and 5,910,366 as capable of diminishing diffusion of soluble ionic species away from the cathode during discharge.

Alternatively or in addition, the separator can prevent substantial diffusion of soluble ionic metal species (e.g., $Ag^+$, $Ag^{2+}$, $Cu^+$, $Cu^{2+}$, $Bi^{5+}$, and/or $Bi^{3+}$) away from the cathode to the zinc anode, such as the separator described in U.S. Pat. No. 5,952,124. The separator can include a substrate membrane such as cellophane, nylon (e.g., Pellon® sold by Freundenburg, Inc.), microporous polypropylene (e.g., Celgard® 3559 sold by Celgard, Inc.) or a composite material including a dispersion of a carboxylic ion-exchange material in a microporous acrylic copolymer (e.g., PD2193 sold by Pall-RAI, Inc.). The separator can further include a polymeric coating thereon including a sulfonated polyaromatic ether, as described in U.S. Pat. Nos. 5,798,180; 5,910,366; and 5,952,124.

In other embodiments, separator 16 can include an adsorptive or trapping layer. Such a layer can include inorganic particles that can form an insoluble compound or an insoluble complex with soluble transition metal species to limit diffusion of the soluble transition metal species through the separator to the anode. The inorganic particles can include metal oxide nanoparticles, for example, as $ZrO_2$ and $TiO_2$. Although such an adsorptive separator can attenuate the concentration of the soluble transition metal species, it may become saturated and lose effectiveness when high concentrations of soluble metal species are adsorbed. An example of such an adsorptive separator is disclosed in commonly assigned U.S. Pat. Nos. 7,914,920 and 8,048,556.

Battery housing 18 can be any conventional housing commonly used for primary alkaline batteries. The battery housing 18 can be fabricated from metal, for example, nickel-plated cold-rolled steel. The housing generally includes an inner electrically-conductive metal wall and an outer electrically non-conductive material such as heat shrinkable plastic. An additional layer of conductive material can be disposed between the inner wall of the battery housing 18 and cathode 12. This layer may be disposed along the inner surface of the wall, along the circumference of cathode 12 or both. This conductive layer can be applied to the inner wall of the battery, for example, as a paint or dispersion including a carbonaceous material, a polymeric binder, and one or more solvents. The carbonaceous material can be carbon particles, for example, carbon black, partially graphitized carbon black or graphite particles. Such materials include LB 1000 (Timcal, Ltd.), Eccocoat 257 (W. R. Grace & Co.), Electrodag 109 (Acheson Colloids, Co.), Electrodag 112 (Acheson), and EB0005 (Acheson). Methods of applying the conductive layer are disclosed in, for example, Canadian Patent No. 1,263,697, which is hereby incorporated by reference.

The anode current collector 20 passes through seal 22 extending into anode 14. Current collector 20 is made from a suitable metal, such as brass or brass-plated steel. The upper end of current collector 20 electrically contacts the negative top cap 24. Seal 22 can be made, for example, of nylon.

Battery 10 can be assembled using conventional methods and hermetically sealed by a mechanical crimping process. In some embodiments, positive electrode 12 can be formed by a pack and drill method, described in U.S. Ser. No. 09/645,632, filed Aug. 24, 2000.

Battery 10 can be a primary electrochemical cell or in some embodiments, a secondary electrochemical cell. Primary batteries are meant to be discharged (e.g., to exhaustion) only once, and then discarded. In other words, primary batteries are not intended to be recharged. Primary batteries are described, for example, by D. Linden and T. B. Reddy (*Handbook of Batteries*, $3^{rd}$ ed., New York: McGraw-Hill Co., Inc., 2002). In contrast, secondary batteries can be recharged many times (e.g., more than fifty times, more than a hundred times, more than a thousand times). In some cases, secondary batteries can include relatively robust separators, such as those having many layers and/or that are relatively thick. Secondary batteries can also be designed to accommodate changes, such as swelling, that can occur in the batteries. Secondary batteries are described, for example, by T. R. Crompton (*Battery Reference Book*, 3rd ed., Oxford: Reed Educational and Professional Publishing, Ltd., 2000) and D. Linden and T. B. Reddy (*Handbook of Batteries*, 3rd ed., New York: McGraw-Hill Co., Inc., 2002).

Battery 10 can have any of a number of different nominal discharge voltages (e.g., 1.2 V, 1.5 V, 1.65 V), and/or can be, for example, a AA, AAA, AAAA, C, or D battery. While battery 10 can be cylindrical, in some embodiments, battery 10 can be non-cylindrical. For example, battery 10 can be a coin cell, a button cell, a wafer cell, or a racetrack-shaped cell. In some embodiments, a battery can be prismatic. In certain embodiments, a battery can have a rigid laminar cell configuration or a flexible pouch, envelope or bag cell configuration. In some embodiments, a battery can have a spirally wound configuration, or a flat plate configuration. Batteries are described, for example, in U.S. Pat. No. 6,783,893; U.S. Patent Application Publication No. 2007/0248879 A1, filed on Jun. 20, 2007; and U.S. Pat. No. 7,435,395.

The following examples are illustrative and not intended to be limiting.

EXAMPLES

Example 1

Synthesis of LiNiO$_2$

A stoichiometric lithium nickel oxide, LiNiO$_2$ was synthesized by blending 93.91 g of a commercial spherical β-nickel oxyhydroxide powder (e.g., β-NiOOH, Kansai Catalyst Co.) and 42.97 g of a monohydrated lithium hydroxide (LiOH.H$_2$O, Aldrich Chemical) and heating the mixture at about 210° C. in a tube furnace for about 20 hours under an oxygen gas flow. The heated mixture was allowed to furnace cool to ambient room temperature, ground with a mortar and pestle, and re-heated at 800° C. for an additional 48 hours under flowing oxygen gas. The x-ray powder diffraction pattern of the final reaction product corresponded closely to that reported for stoichiometric LiNiO$_2$ (e.g., ICDD PDF No. 09-0063), as described, for example, in U.S. Pat. No. 5,720,932, J. Maruta et al. (Journal of Power Sources, 2000, 90, 89-94) and Y. Sun et al. (Solid State Ionics, 2006, 177, 1173-7).

Example 2

Synthesis of Delithiated Li$_x$NiO$_2$

The lithium nickelate of Example 1 was delithiated by a low-temperature acid treatment process similar to that disclosed in Example 1 of U.S. application Ser. No. 12/722,669, herein incorporated in its entirety. Specifically, approximately 100 g of LiNiO$_2$ was added to 1.5 L of a rapidly stirred aqueous 6 M H$_2$SO$_4$ solution cooled to between 0 and 5° C. The resulting slurry is stirred and maintained at about 2° C. for either about 20 hours (Ex. 2a) or 40 hours (Ex. 2b). Next, the suspended solids were allowed to settle, the supernatant liquid removed by decantation, and the solid washed with aliquots of de-ionized water until the pH of the supernatant was nearly neutral (i.e., pH ~6-7). The solid was collected by either pressure or vacuum filtration and dried at about 80° C. in air for about 24 hours. The residual lithium content of the dried, delithiated Li$_x$NiO$_2$ product was determined by ICP spectroscopy to be less than 2.2 wt % Li, corresponding to x=0.31 (Ex. 2a) and greater than 0.4 wt % Li, corresponding to x=0.06 (Ex. 2b). The x-ray powder diffraction pattern of the delithiated product was similar to that of the stoichiometric LiNiO$_2$ with the expected shifts in the positions of the diffraction peaks to higher 2θ angles. Average particle size of the delithiated Li$_x$NiO$_2$ powder ranged from about 1 to 8 μm and the B.E.T. specific surface area was about 1.36 m$^2$/g. The true density of the Li$_x$NiO$_2$ powder was measured by He pycnometer as 4.70 g/cm$^3$.

The electrochemical discharge performance of the delithiated Li$_x$NiO$_2$ was evaluated in 635-type alkaline button cells. Generally, button cells were assembled in the following manner. Dried Li$_x$NiO$_2$ powder was blended together manually with an oxidation resistant graphite (e.g., Timrex SFG-15 from Timcal) and a KOH electrolyte solution containing 35.3 wt % KOH and 2 wt % zinc oxide in a weight ratio of 75:20:5 using a mortar and pestle to form a wet cathode mix. About 0.45 g of the wet cathode mix was pressed into a nickel grid welded to the bottom of the cathode can of the cell. A disk of porous separator material including a layer of cellophane bonded to a non-woven polymeric layer (e.g., "Duralam" or PDM "PA25") and saturated with electrolyte solution was positioned on top of the cathode. Additional KOH electrolyte solution was added to the separator to ensure that electrolyte solution fully penetrated the separator and wet the underlying cathode. A polymeric insulating seal was placed on the edge of the anode can. About 2.6 g of anode slurry containing zinc alloy particles, electrolyte solution, and a gelling agent was added to the anode can. Next, the anode can with the polymeric seal was positioned on top of the cathode can and the two cans mechanically crimped together to hermetically seal the cell.

Figure 10:
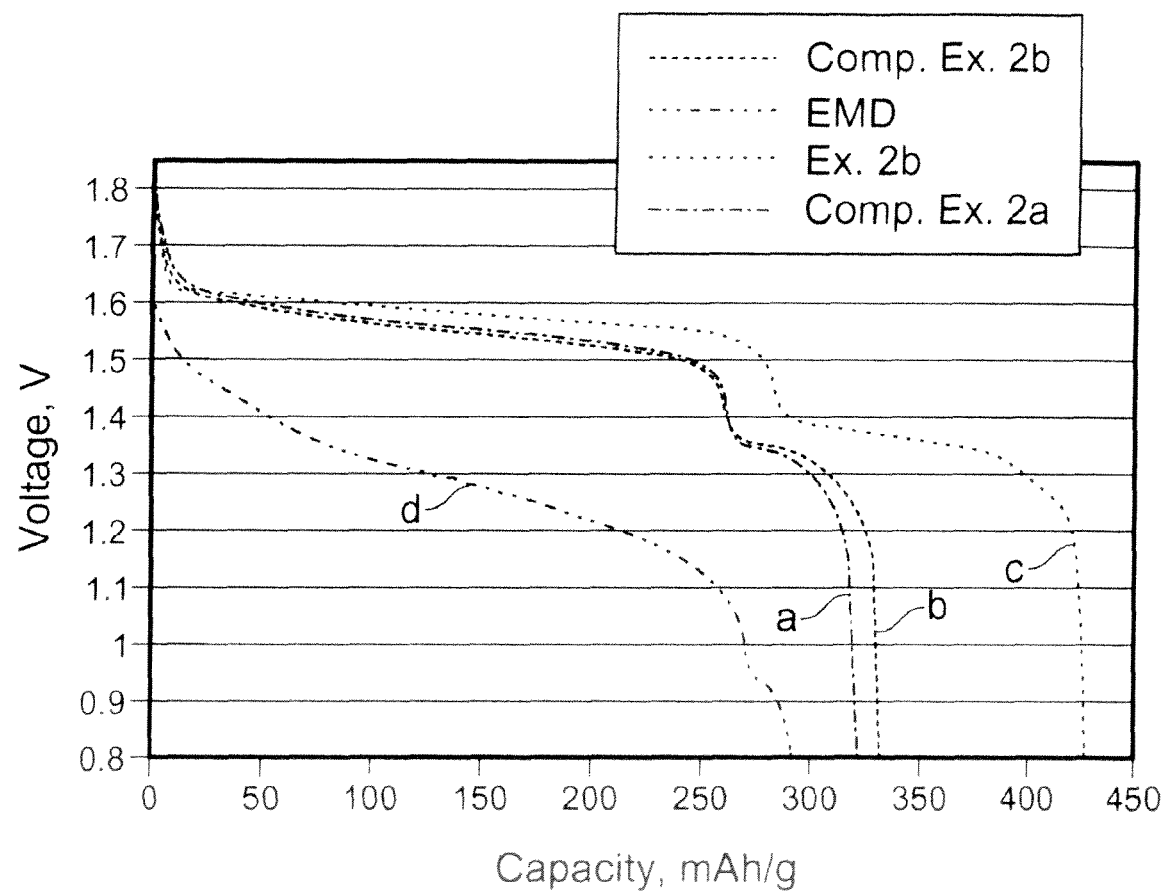
FIG. 10 is a plot depicting a comparison of discharge curves for alkaline button cells with cathodes including: (a) delithiated cobalt and aluminum-doped nickel(IV) oxide, $Li_xNi_{0.80}Co_{0.15}Al_{0.05}O_2$; (b) delithiated cobalt, aluminum, and boron-doped nickel (IV) oxide, $Li_xNi_{0.791}Co_{0.149}Al_{0.049}B_{0.01}O_2$; (c) delithiated undoped nickel(IV) oxide, $Li_xNiO_2$; and (d) electrolytic manganese dioxide (EMD), all discharged at a nominal low rate (i.e., 9.5 mA/g) to a 0.8 V cutoff voltage.

Generally, cells were tested within 24 hours after closure. OCV values were measured immediately before discharge and are listed in Table 3, infra. Cells were discharged continuously at relatively low and high rates of 7.5 mA/g and 60 mA/g, respectively to a cutoff voltage of 0.8 V. Gravimetric specific capacities (i.e., mAh/g) for cells discharged at low and high rates are given in Table 3, infra. The capacity of the cells of Example 2b containing delithiated Li$_{0.06}$NiO$_2$ prepared from the LiNiO$_2$ of Example 1 and discharged to a 0.8 V cutoff at a 10 mA/g constant current is about 150% of that of the cells of Comparative Example 1 containing EMD (e.g., Tronox AB) as the only cathode active material. Further, the discharge voltage profile has two relatively flat plateaus with average voltage values of about 1.55 V and 1.35 V. A representative discharge curve for the cells of Example 2b is shown in FIG. 10.

Example 3

Figure 2:
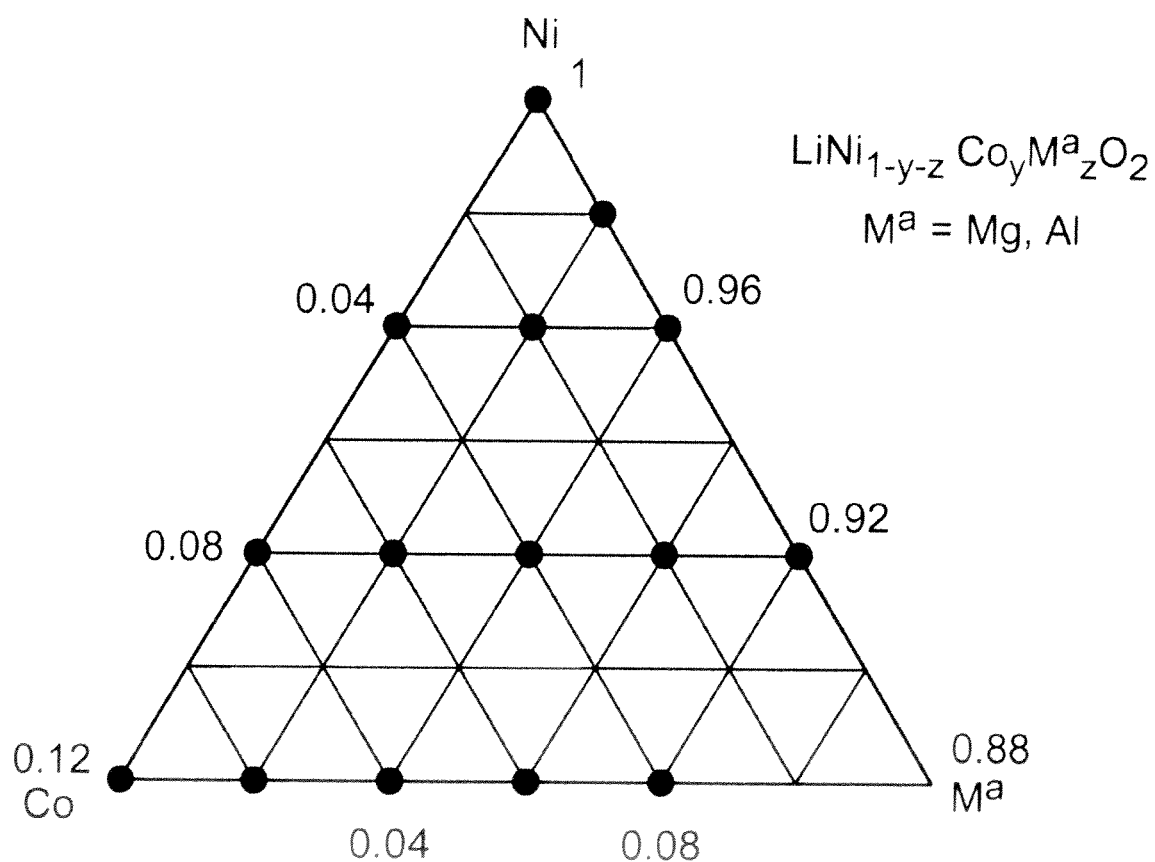
FIG. 2 is a plot depicting the Ni-rich portion of the ternary composition diagram for Li—Ni—Co—Mg and Li—Ni—Co—Al oxide systems, indicating the compositions of 28 metal-doped lithium nickel oxides, which are precursors to the corresponding delithiated (i.e., lithium deficient) metal-doped nickel (IV) oxides.

Synthesis of Metal-Doped Lithium Nickel Oxide, LiNi$_{1-y-z}$Co$_y$M$_z$O$_2$ Metal-doped Li(Ni$_{1-y-z}$Co$_y$Al$_z$)O$_2$ and Li(Ni$_{1-y-z}$Co$_y$Mg$_z$)O$_2$ systems shown in the ternary composition diagram in FIG. 2 were synthesized, delithiated, and evaluated for performance of the corresponding delithiated (i.e., lithium deficient) metal-doped nickel oxide active materials with regard to oxygen gas evolution, initial open circuit voltage (OCV), fresh (i.e., 24 hour) discharge capacity, and capacity retention, after storage at ambient and elevated temperatures.

Metal-substituted lithium nickel oxides, LiNi$_{1-y-z}$Co$_y$M$_z$O$_2$ (M=Mg, Al) were synthesized by blending 10.00 g of spherical β-nickel oxyhydroxide powder prepared by oxidation of a commercial spherical β-nickel hydroxide powder (e.g., Changsha Research Institute of Mining & Metallurgy, Changsha, P.R.C.; Kansai Catalyst Co., Ltd., Osaka, Japan) by the method of Comparative Example 2

(infra) with stoichiometric amounts of a cobalt oxide ($Co_3O_4$, Aldrich, 99.8%) and either magnesium oxide (MgO, Aldrich, >99%) or aluminum metal powder (Al, Acros, 99%) and lithium hydroxide monohydrate ($LiOH \cdot H_2O$, Aldrich, >99%) to obtain the target atom ratios required for the desired compositions. The target Example 3 compositions have the following Li:Ni:Co:M metal atom ratios: Example 3a 1:0.96:0.04:0; 3b 1:0.92:0.08:0; 3c 1:0.88:0.12:0; 3d-1(M=Mg), 3d-2(M=Al) 1:0.98:0:0.2; 3e-1 (M=Mg), 3e-2(M=Al) 1:0.96:0:0.04; 3f-1(M=Mg), 3f-2 (M=Al) 1:0.92:0:0.08; 3g-1(M=Mg), 3g-2(M=Al) 1:0.96: 0.02:0.02; 3h-1(M=Mg), 3h-2(M=Al) 1:0.92:0.06:0.02; 3i-1 (M=Mg), 3i-2(M=Al) 1:0.92:0.04:0.04; 3j-1 (M=Mg), 3j-2 (M=Al) 1:0.92:0.02:0.06; 3k-1(M=Mg), 3k-2(M=Al) 1:0.88:0.10:0.02; 3l-1(M=Mg), 3l-2(M=Al) 1:0.88:0.08: 0.04; 3m-1(M=Mg), 3m-2(M=Al) 1:0.88:0.06:0.06; 3n-1 (M=Mg), 3n-2(M=Al) 1:0.88:0.04:0.08. All the mixtures were simultaneously mixed by high-energy milling and then heated to 210° C. at a ramp rate of 0.5° C./min, held for 16-20 hours at temperature in flowing $O_2$, and allowed to furnace cool. The mixtures were simultaneously re-milled and re-heated in flowing $O_2$ first to 150° C. (2.5° C./min ramp rate) and held for 30 minutes, next to 350° C. (4° C./min ramp rate) and held for 3 hours, and finally to 800° C. (4° C./min ramp rate) and held for 48 hours and finally allowed to furnace cool to ambient room temperature (in flowing $O_2$).

Figure 3:
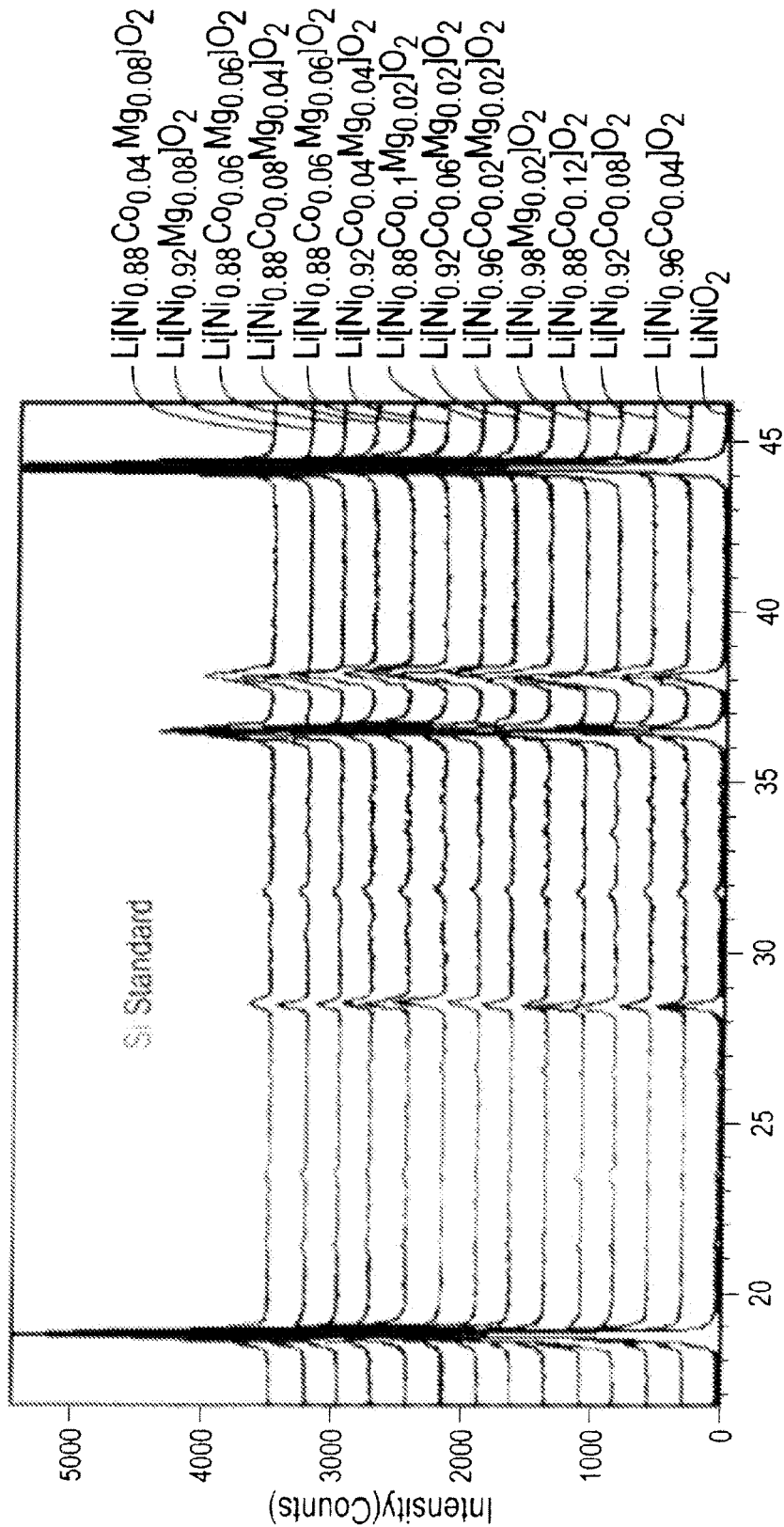
FIG. 3 is a plot depicting an overlay of the x-ray powder diffraction patterns for cobalt, and cobalt and magnesium-doped lithium nickel oxide compositions, and undoped lithium nickel oxide, measured using Cu Kα radiation and scanned between 17 and 46 degrees 2θ.
Figure 4:
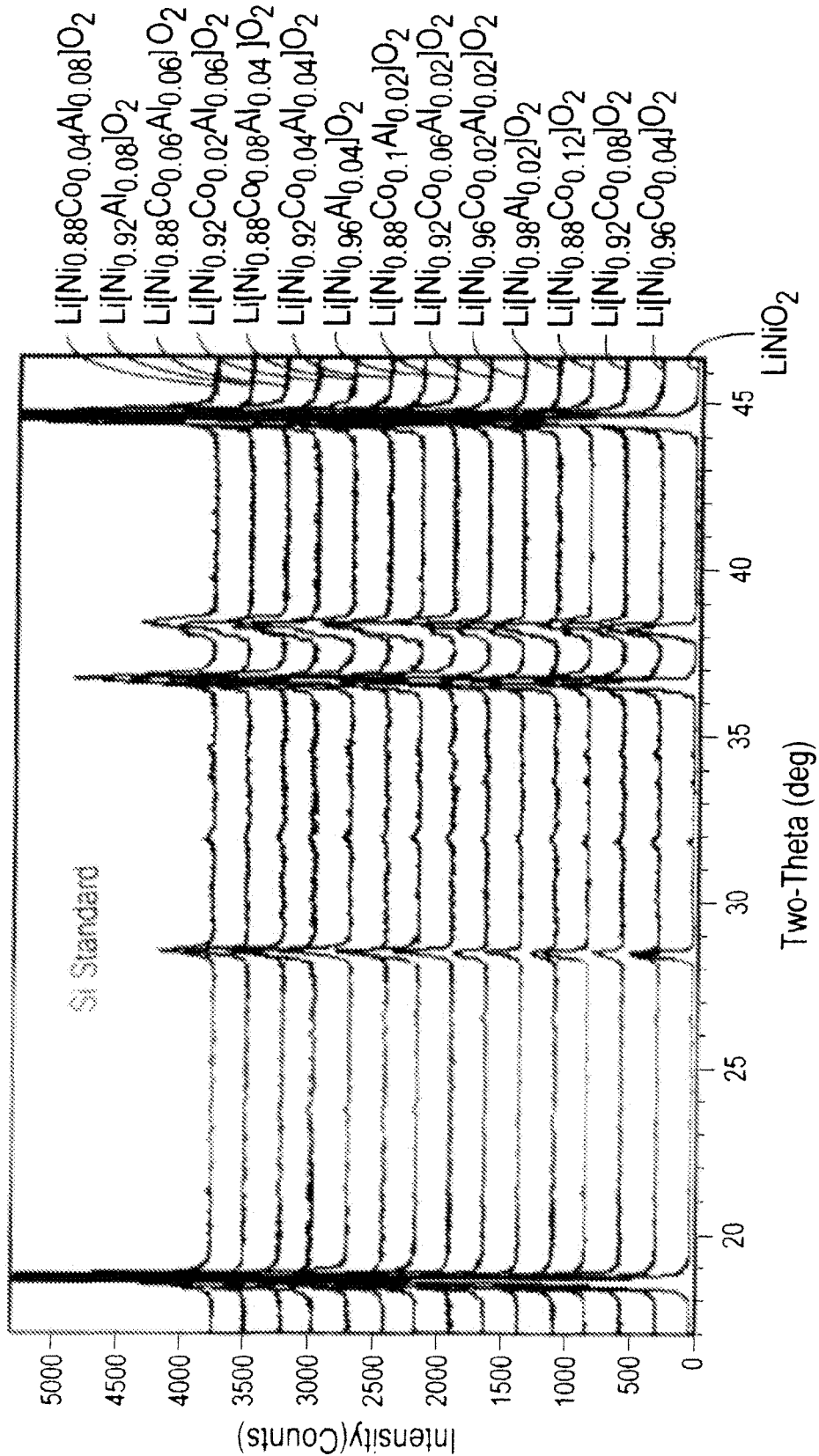
FIG. 4 is a plot depicting an overlay of the x-ray powder diffraction patterns for cobalt, and cobalt and aluminum-doped lithium nickel oxide compositions, and undoped lithium nickel oxide, measured using Cu Kα radiation and scanned between 17 and 46 degrees 2θ.

The product powders were re-milled to break up aggregates. The measured X-ray diffraction patterns for the 25 metal-doped and the undoped lithium nickel oxides were consistent with a layered $\alpha$-$FeO_2$-type structure and comparable to that reported for a stoichiometric $LiNiO_2$ (ICDD, PDF#09-0063). The overlaid x-ray powder diffraction patterns of the re-milled powders are shown in FIGS. 3 and 4.

Elemental analyses for selected compositions of the delithiated metal-doped nickel (IV) oxide of Examples 2 and 3 (after acid treatment) are summarized in Table 1. Samples of metal-substituted lithium nickel oxides were acid-treated for two different periods of time (e.g., 20 and 40 hours) to determine the relationship between treatment time and the extent of delithiation (i.e., lithium extraction). All of the samples were treated simultaneously for the same length of time and under the same temperature and mixing conditions to minimize variability. In general, most of the lithium ions appeared to be removed during the first 20 hours of acid-treatment, nearly independent of the composition. However, removal of any portion of the remaining lithium during an additional 20 hours of acid treatment significantly increased the total discharge capacity. Additional acid treatment of selected samples of metal-substituted lithium nickel oxide for up to 60 hours total did not substantially decrease the amount of residual Li nor increase discharge capacity in button cells. Residual Li levels corresponded to an atom ratio of about 0.1 or less (i.e., <1 wt %) for acid treatment times of 40 hours or greater. In contrast, the amount of residual Li level after 20 hours of acid treatment was generally greater than three times that for 40 hours (e.g., >2 wt %).

TABLE 1

Elemental analyses for selected layered metal-doped lithium nickel oxides and the corresponding delithiated nickel (IV) oxides and a $Ni(OH)_2$ precursor.

| Ex. No. | Nominal Composition of Precursor | Delith. Time (h) | Li | Ni | Co | Mg | Al |
|---|---|---|---|---|---|---|---|
| 2a | $LiNiO_2$ | 20 | 0.31 | 1.04 | — | — | — |
| 2b | $LiNiO_2$ | 40 | 0.06 | 1.09 | — | — | — |
| — | $LiNi_{0.96}Mg_{0.04}O_2$ | 20 | 0.19 | 1.02 | — | 0.04 | — |
| 3e-1 | $LiNi_{0.96}Mg_{0.04}O_2$ | 40 | 0.06 | 1.02 | — | 0.04 | — |
| — | $LiNi_{0.96}Al_{0.04}O_2$ | 20 | 0.30 | 1.01 | — | — | 0.02 |
| 3e-2 | $LiNi_{0.96}Al_{0.04}O_2$ | 40 | 0.07 | 1.03 | — | — | 0.03 |
| — | $LiNi_{0.96}Co_{0.02}Mg_{0.02}O_2$ | 20 | 0.20 | 1.07 | 0.05 | 0.02 | — |
| — | $LiNi_{0.92}Co_{0.04}Mg_{0.04}O_2$ | 20 | 0.31 | 1.00 | 0.08 | 0.04 | — |
| 3i-1 | $LiNi_{0.92}Co_{0.04}Mg_{0.04}O_2$ | 40 | 0.07 | 1.01 | 0.10 | 0.04 | — |
| — | $LiNi_{0.92}Co_{0.04}Al_{0.04}O_2$ | 20 | 0.13 | 0.99 | 0.08 | — | 0.04 |
| — | $LiNi_{0.92}Co_{0.08}O_2$ | 20 | 0.33 | 0.96 | 0.12 | — | — |
| 3b | $LiNi_{0.92}Co_{0.08}O_2$ | 40 | 0.12 | 1.00 | 0.13 | — | — |
| 3m-1 | $LiNi_{0.88}Co_{0.06}Mg_{0.06}O_2$ | 40 | 0.08 | 1.02 | 0.07 | 0.10 | — |
| 3k-1 | $LiNi_{0.88}Co_{0.10}Mg_{0.02}O_2$ | 40 | 0.01 | 0.96 | 0.14 | 0.02 | — |
| — | $Ni(OH)_2$ | — | — | 0.98 | 0.02 | — | — |

Figure 5:
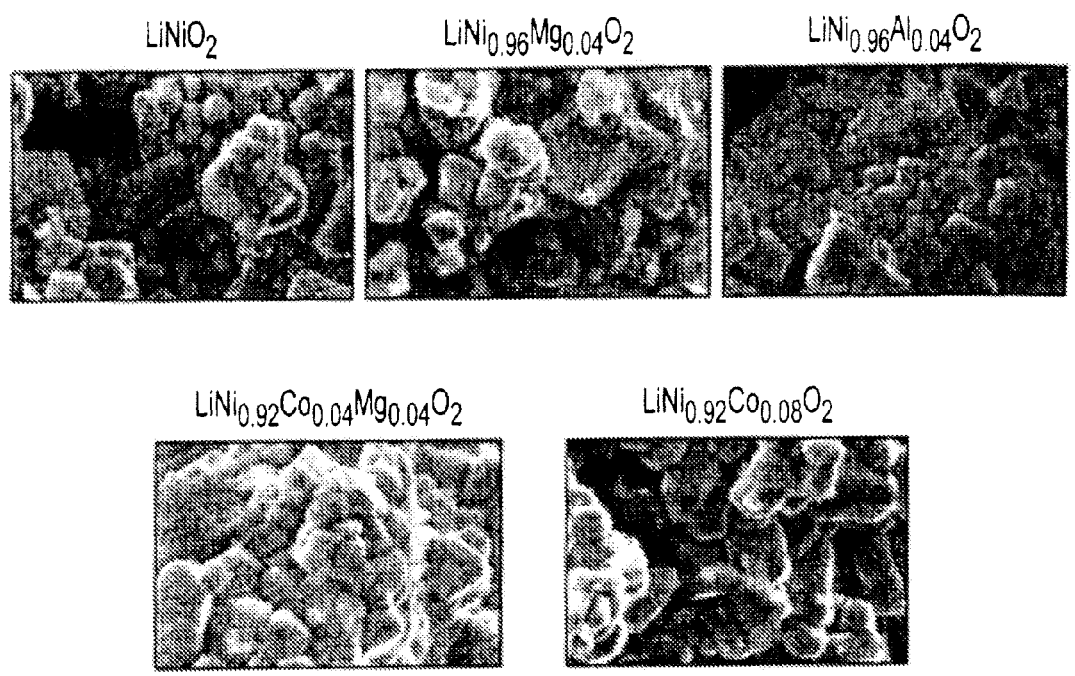
FIG. 5 includes SEM images showing representative morphologies and crystallite sizes for selected metal-doped lithium nickel oxide powders: (a) undoped lithium nickel oxide, $LiNiO_2$; (b) magnesium-doped lithium nickel oxide, $LiNi_{0.96}Mg_{0.04}O_2$; (c) aluminum-doped lithium nickel oxide, $LiNi_{0.96}Al_{0.04}O_2$; (d) cobalt and magnesium-doped lithium nickel oxide, $Li(Ni_{0.92}Co_{0.04}Mg_{0.04})O_2$; and (e) cobalt-doped lithium nickel oxide, $LiNi_{0.92}Co_{0.08}O_2$. Magnification for all cases is 10,000×.

Samples were measured using inductively coupled plasma atomic emission spectroscopy ("ICP-AE") by a commercial analytical laboratory (e.g., Galbraith Laboratories, Inc., Knoxville, Tenn.). Average particle sizes for the metal-substituted lithium nickel oxides can be estimated from analysis of SEM micrographs. All of the synthesized compositions exhibited strongly faceted crystallites ranging in size from about 1 to 4 microns as shown for several selected samples in FIG. 5. All the metal-substituted lithium nickel oxide samples showed evidence for some inter-crystallite sintering resulting in the formation of larger aggregates composed of lightly sintered crystallites prior to delithiation. Specific surface areas (BET) of these aggregates were relatively low, generally less than about 1 $m^2$/g.

Example 4

Synthesis of Delithiated Metal-Doped Nickel Oxide, $Li_xNi_{1-y-z}Co_yM^\alpha_zO_2$ A 10.0 g portion of each of the metal-doped lithium nickel oxides $LiNi_{1-y-z}Co_yM^\alpha_zO_2$ (M=Mg, Al) of Examples 3a-n was simultaneously stirred in separate 150 ml aliquots of 6M $H_2SO_4$ solution held at about 0° C. (e.g., 2-5° C.) for 20 hours and another portion of each for 40 hours. The delithiated solids were collected by filtration, washed with deionized water until washings had nominally neutral pH, and dried at 80° C. in air. The delithiated powders of Examples 4a-n have the following nominal Ni:Co:M metal atom ratios: Example 4a 0.96:0.04:0; 4b 0.92:0.08:0; 4c 0.88:0.12:0;

4d-1(M=Mg), 4d-2(M=Al) 0.98:0:0.2; 4e-1(M=Mg), 4e-2 (M=Al) 0.96:0:0.04; 4f-1(M=Mg), 4f-2(M=Al) 0.92:0:0.08; 4g-1(M=Mg), 4g-2(M=Al) 0.96:0.02:0.02; 4h-1(M=Mg), 4h-2(M=Al) 0.92:0.06:0.02; 4i-1(M=Mg), 4i-2(M=Al) 0.92: 0.04:0.04; 4j-1 (M=Mg), 4j-2(M=Al) 0.92:0.02:0.06; 4k-1 (M=Mg), 4k-2(M=Al) 0.88:0.10:0.02; 4l-1(M=Mg), 4l-2 (M=Al) 0.88:0.08:0.04; 4m-1(M=Mg), 4m-2(M=Al) 0.88: 0.06:0.06; 4n-1(M=Mg), 4n-2(M=Al) 0.88:0.04:0.08. X-ray powder diffraction patterns of the dried solids were measured using Cu Kα radiation. Thermal stabilities of selected samples of delithiated powders of Example 4a-n were determined by DSC. The amount of residual lithium was determined for selected samples of delithiated powders of Example 4a-n by ICP-EA and is shown in Table 1.

To determine the relative effectiveness of partial substitution of nickel by other metal ions on decreasing the extent of electrolyte oxidation by the delithiated metal-doped nickel(IV) oxides, the amount of evolved oxygen gas was measured as a function of time at a controlled temperature. Mixtures containing 60.6 wt % delithiated metal-doped nickel(IV) oxide, 3 wt % graphite, and 36.4 wt % alkaline electrolyte solution were placed inside laminated foil bags and heat-sealed closed. The bags were placed in an oven and held at various temperatures, for example, 25, 45 or 60° C. for pre-determined periods of time. The total amount of oxygen gas evolved per gram of delithiated nickel(IV) oxide was determined by measuring the relative buoyancy of the foil bag containing the trapped gas using Archimede's principle after storage for 0.5, 3.5, 7, 14, and 21 days. Samples of delithiated metal-doped nickel(IV) oxides having selected compositions were evaluated.

Other materials having known gassing properties can be used as references for comparison. For example, a sample of delithiated undoped nickel(IV) oxide evolved the largest amount of gas in the shortest period of time. After 3.5 days at 25° C., more than 7 cm³ of oxygen gas per gram was evolved. In the same period of time and at the same temperature, less than 0.5 cm³ of oxygen was evolved per gram of a typical commercial EMD. Further, in the same period of time, a delithiated cobalt-doped nickel(IV) oxide with a composition of $Li_{0.12}Ni_{0.92}Co_{0.08}O_2$ evolved the least amount of oxygen gas for delithiated metal-doped nickel (IV)-containing oxides, i.e., about 40% of that evolved by the delithiated undoped nickel(IV) oxide. In fact, the total amount of oxygen gas evolved after 21 days at 25° C. was less than 4.25 cm³ per gram or less than 50% of that evolved by the delithiated undoped nickel(IV) oxide. A delithiated magnesium-doped nickel(IV) oxide with a composition of $Li_{0.06}Ni_{0.96}Co_{0.04}O_2$ evolved less than 6 cm³ of oxygen per gram of oxide after 21 days. A delithiated cobalt and magnesium multiply-doped nickel(IV) oxide with a composition of $Li_{0.07}Ni_{0.92}Co_{0.04}Mg_{0.04}O_2$ evolved about 10% more total oxygen than the magnesium-doped nickel(IV) oxide. The rate of oxygen gas evolution also decreased rapidly for those compositions with the least total evolved oxygen. It is believed that surface passivation could be responsible for the rapid cessation of oxygen evolution. Oxygen gas evolution results for selected compositions stored for up to 3 weeks at 25° C. are summarized in Table 2.

TABLE 2

Oxygen gas evolution at 25° C. by selected delithiated metal-substituted Ni(IV) oxides.

| | | Vol. gas evolved/g matl @25° C. (cm³) | | | | |
|---|---|---|---|---|---|---|
| Ex. No. | Nominal Compositions | 0.5 days | 3.5 days | 7 days | 14 days | 21 days |
| 2b | $Li_{0.06}NiO_2$ | 5.8 | 7.2 | 7.6 | 8.4 | 8.6 |
| 4e-1 | $Li_{0.06}Ni_{0.96}Mg_{0.04}O_2$ | 2.9 | 4.4 | 5.7 | 5.8 | 5.9 |
| 4e-2 | $Li_{0.07}Ni_{0.96}Al_{0.04}O_2$ | 5.3 | 6.5 | 7.2 | 7.5 | 8.2 |
| 4i-1 | $Li_{0.07}Ni_{0.92}Co_{0.04}Mg_{0.04}O_2$ | 4.1 | 5.3 | 5.9 | 6.2 | 6.5 |
| 4b | $Li_{0.12}Ni_{0.92}Co_{0.08}O_2$ | 3.1 | 3.2 | 4.1 | 4.2 | 4.4 |
| C-2 | $Li_xNi_{0.8}Co_{0.15}Al_{0.05}O_2$ | — | — | 2.8 | — | — |

Figure 6:
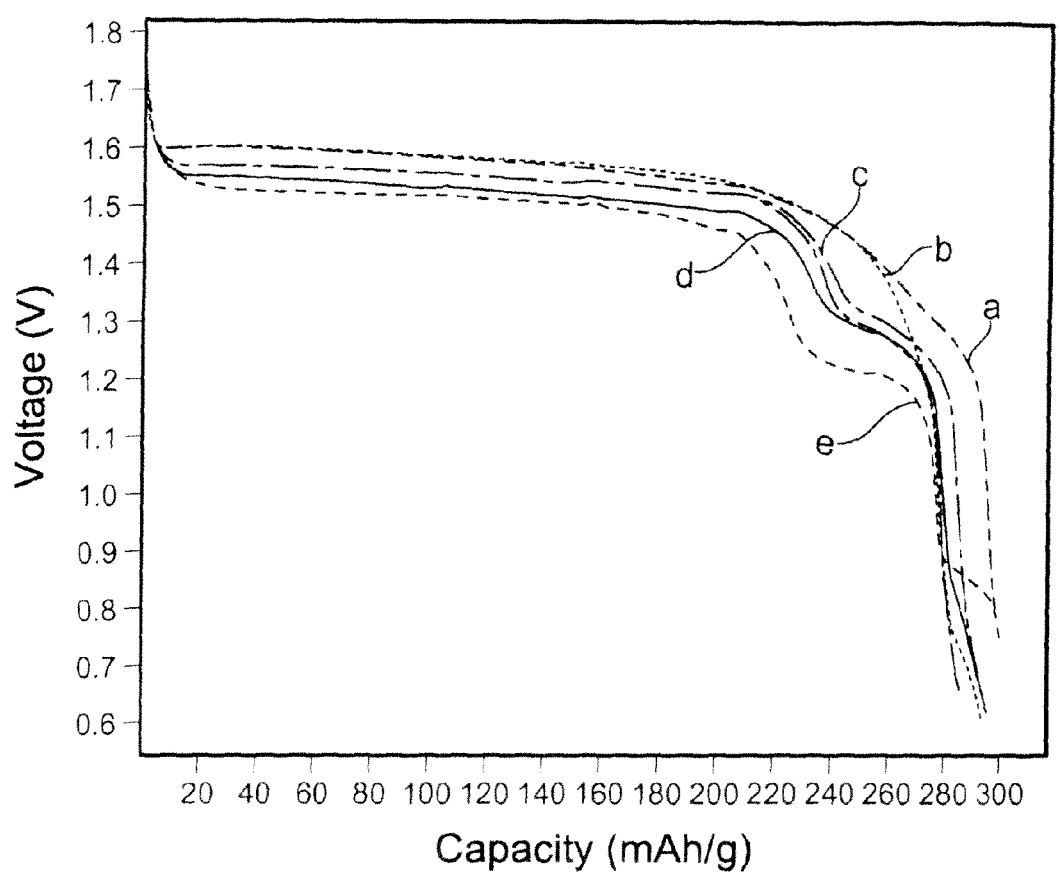
FIG. 6 is a plot depicting an overlay of the voltage profile curves for alkaline button cells with cathodes including delithiated magnesium and/or cobalt-doped nickel(IV) oxides: (a) $Li_xNi_{0.88}Co_{0.04}Mg_{0.08}O_2$; (b) $Li_xNi_{0.88}Co_{0.06}Mg_{0.06}O_2$, (c) $Li_xNi_{0.88}Co_{0.08}Mg_{0.04}O_2$, (d) $Li_xNi_{0.88}Co_{0.10}Mg_{0.02}O_2$; and (e) $Li_xNi_{0.88}Co_{0.12}O_2$, discharged at a nominal low rate (i.e., 7.5 mA/g) to a 0.8 V cutoff voltage.
Figure 7:
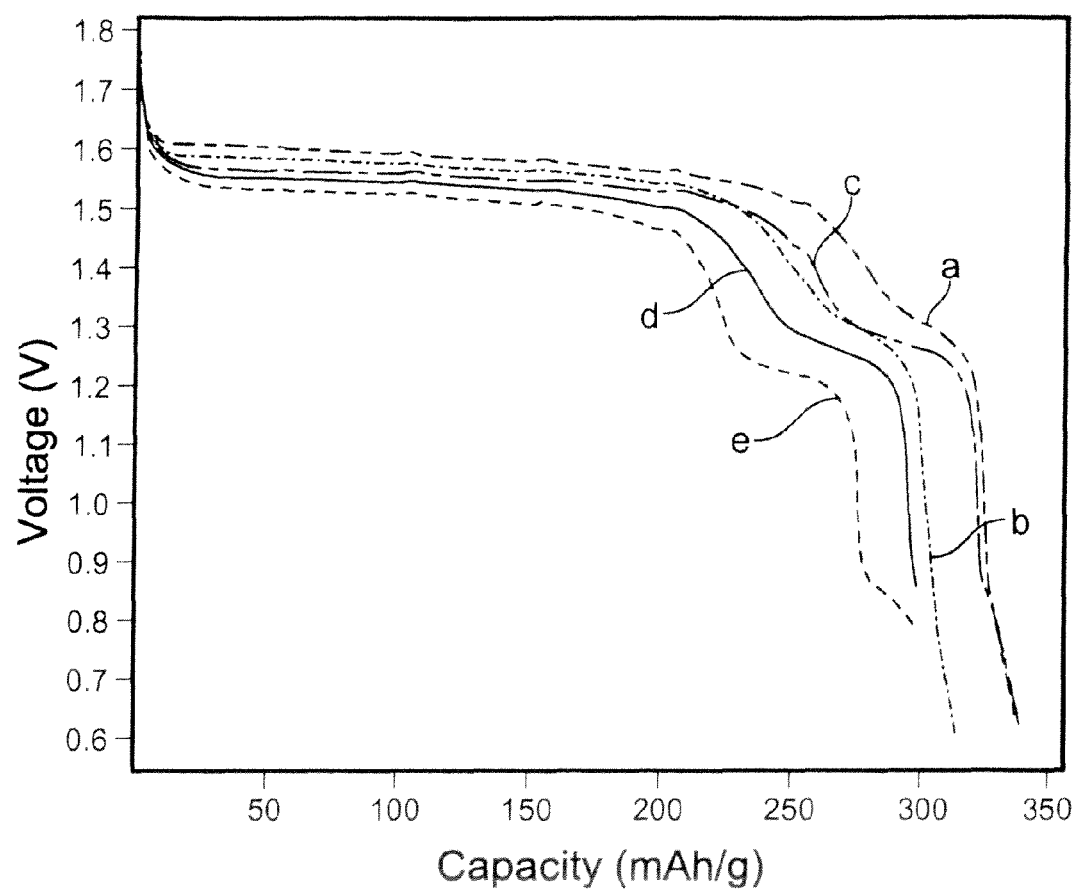
FIG. 7 is a plot depicting an overlay of the voltage profile curves for alkaline button cells with cathodes including delithiated metal-doped nickel(IV) oxides: (a) $Li_xNi_{0.88}Co_{0.04}Al_{0.08}O_2$; (b) $Li_xNi_{0.88}Co_{0.06}Al_{0.06}O_2$; (c) $Li_xNi_{0.88}Co_{0.08}Al_{0.04}O_2$; (d) $Li_xNi_{0.88}Co_{0.10}Al_{0.02}O_2$; and (e) $Li_xNi_{0.88}Co_{0.12}O_2$ discharged at a nominal low rate (i.e., 7.5 mA/g) to a 0.8 V cutoff voltage.

Discharge performance of delithiated metal-doped nickel (IV)-containing oxides that had been acid-treated for at least 40 hours was evaluated in 635-type alkaline button cells. Formulation of the cathode mix included blending the delithiated metal-doped nickel (IV) oxide with an oxidation resistant graphite (e.g., Timrex SFG-15 from Timcal), and alkaline electrolyte (e.g., 9N KOH) in a 75:20:5 mass ratio. The total weight of cathode mix in each cell was about 0.45 g. The anode contained a large excess of Zn slurry (e.g., about 2.6 g/cell). OCV values measured within one hour after cell closure generally ranged from about 1.84 to 1.92 V. Cells were held for at least about 24 hours at ambient room temperature (i.e., "fresh") to ensure thorough absorption of electrolyte by the separator and cathode. OCV values measured immediately before the start of discharge generally ranged from about 1.72 to 1.81 V. In general, fresh OCV values appeared to be independent of dopant type and concentration except for those compositions having high concentrations of Mg only. Cells were discharged both at a relative low rate (e.g., about 7.5 mA/g of active material) as well as at a relative high rate (e.g., about 60 mA/g of active material) to a 0.8 V cutoff voltage. Overlays of representative low-rate discharge curves for button cells with cathodes including selected compositions of delithiated metal-doped nickel (IV) oxides having a constant total dopant concentration are shown in FIGS. 6 and 7. The low-rate discharge curves characteristically have a single, relatively flat voltage plateau ranging between about 1.5 and 1.6 V. Average discharge voltage (i.e., CCV at 50% depth of discharge, "50% DOD") decreased monotonically with increasing cobalt concentration (i.e., in the absence of Mg or Al). Highest average discharge voltages were obtained for compositions containing Mg or Al and little or no Co. Post-storage capacity retention was determined for button cells discharged at low-rate after holding cells for 1 week at 25° C. and 45° C. Average discharge capacities, OCV, and average discharge voltages for all 25 compositions of delithiated metal-doped nickel (IV) oxides are summarized in Table 3.

TABLE 3

Discharge capacities for alkaline button cells with cathodes containing selected delithiated cobalt/magnesium/aluminum-doped nickel (IV) oxides.

| Ex. No. | Nominal Compositions | OCV 24 h, 25° C. | CCV 7.5 mA/g 50% DOD | Low rate capacity (7.5 mA/g) 24 h, 25° C. | Low rate capacity (7.5 mA/g) 1 wk, 25° C. | Low rate capacity (7.5 mA/g) 1 wk, 45° C. | High rate capacity (60 mA/g) 24 h, 25° C. |
|---|---|---|---|---|---|---|---|
| 2b | $NiO_2$ | 1.84 | 1.57 | 334 | 317 | 277 | 381 |
| 4a | $Ni_{0.96}Co_{0.04}O_2$ | 1.78 | 1.53 | 364 | | 321 | 379 |
| 4b | $Ni_{0.92}Co_{0.08}O_2$ | 1.77 | 1.51 | 358 | 333 | 315 | 372 |
| 4c | $Ni_{0.88}Co_{0.12}O_2$ | 1.79 | 1.50 | 337 | | 302 | 320 |
| 4d-1 | $Ni_{0.98}Mg_{0.02}O_2$ | 1.81 | 1.56 | 359 | | 322 | 363 |
| 4e-1 | $Ni_{0.96}Mg_{0.04}O_2$ | 1.70 | 1.57 | 365 | 347 | 307 | 387 |
| 4f-1 | $Ni_{0.92}Mg_{0.08}O_2$ | 1.61 | 1.49 | 190 | | 228 | — |
| 4g-1 | $Ni_{0.96}Co_{0.02}Mg_{0.02}O_2$ | 1.79 | 1.56 | 322 | | 287 | 345 |
| 4h-1 | $Ni_{0.92}Co_{0.06}Mg_{0.02}O_2$ | 1.76 | 1.54 | 368 | | 318 | 287 |
| 4i-1 | $Ni_{0.92}Co_{0.04}Mg_{0.04}O_2$ | 1.71 | 1.55 | 373 | 362 | — | 387 |
| 4j-1 | $Ni_{0.92}Co_{0.02}Mg_{0.06}O_2$ | 1.72 | 1.57 | 369 | | — | 350 |
| 4k-1 | $Ni_{0.88}Co_{0.10}Mg_{0.02}O_2$ | 1.81 | 1.52 | 303 | | 265 | 370 |
| 4l-1 | $Ni_{0.88}Co_{0.08}Mg_{0.04}O_2$ | 1.77 | 1.55 | 316 | | 283 | 332 |
| 4m-1 | $Ni_{0.88}Co_{0.06}Mg_{0.06}O_2$ | 1.78 | 1.58 | 347 | | 318 | 368 |
| 4n-1 | $Ni_{0.88}Co_{0.04}Mg_{0.08}O_2$ | — | — | — | | 293 | — |
| 4d-2 | $Ni_{0.98}Al_{0.02}O_2$ | 1.80 | 1.59 | 352 | | 295 | 373 |
| 4e-2 | $Ni_{0.96}Al_{0.04}O_2$ | 1.78 | 1.59 | 363 | 236 | 323 | 374 |
| 4f-2 | $Ni_{0.92}Al_{0.08}O_2$ | 1.80 | 1.57 | 286 | | 242 | 383 |
| 4g-2 | $Ni_{0.96}Co_{0.02}Al_{0.02}O_2$ | 1.76 | 1.56 | 359 | | 302 | 373 |
| 4h-2 | $Ni_{0.92}Co_{0.06}Al_{0.02}O_2$ | 1.76 | 1.53 | 342 | | 301 | 328 |
| 4i-2 | $Ni_{0.92}Co_{0.04}Al_{0.04}O_2$ | 1.81 | 1.56 | 340 | | 294 | 340 |
| 4j-2 | $Ni_{0.92}Co_{0.02}Al_{0.06}O_2$ | 1.75 | 1.57 | 351 | | 292 | 383 |
| 4k-2 | $Ni_{0.88}Co_{0.10}Al_{0.02}O_2$ | 1.78 | 1.52 | 338 | | 302 | 355 |
| 4l-2 | $Ni_{0.88}Co_{0.08}Al_{0.04}O_2$ | 1.79 | 1.54 | 360 | | 318 | 374 |
| 4m-2 | $Ni_{0.88}Co_{0.06}Al_{0.06}O_2$ | 1.78 | 1.55 | 340 | | 266 | 333 |
| 4n-2 | $Ni_{0.88}Co_{0.04}Al_{0.08}O_2$ | 1.72 | 1.57 | 360 | | 316 | 338 |
| C-3a | $Ni_{0.9}Co_{0.1}O_2$ | — | — | 355 | | — | — |
| C-3b | $Ni_{0.8}Co_{0.2}O_2$ | 1.81 | 1.50 | 335 | | — | — |
| C-2a | $Ni_{0.8}Co_{0.15}Al_{0.05}O_2$ | 1.85 | 1.55 | 325 | | — | — |
| C-2b | $Ni_{0.791}Co_{0.149}Al_{0.049}B_{0.01}O_2$ | 1.83 | 1.55 | 335 | | — | — |

Figure 8:
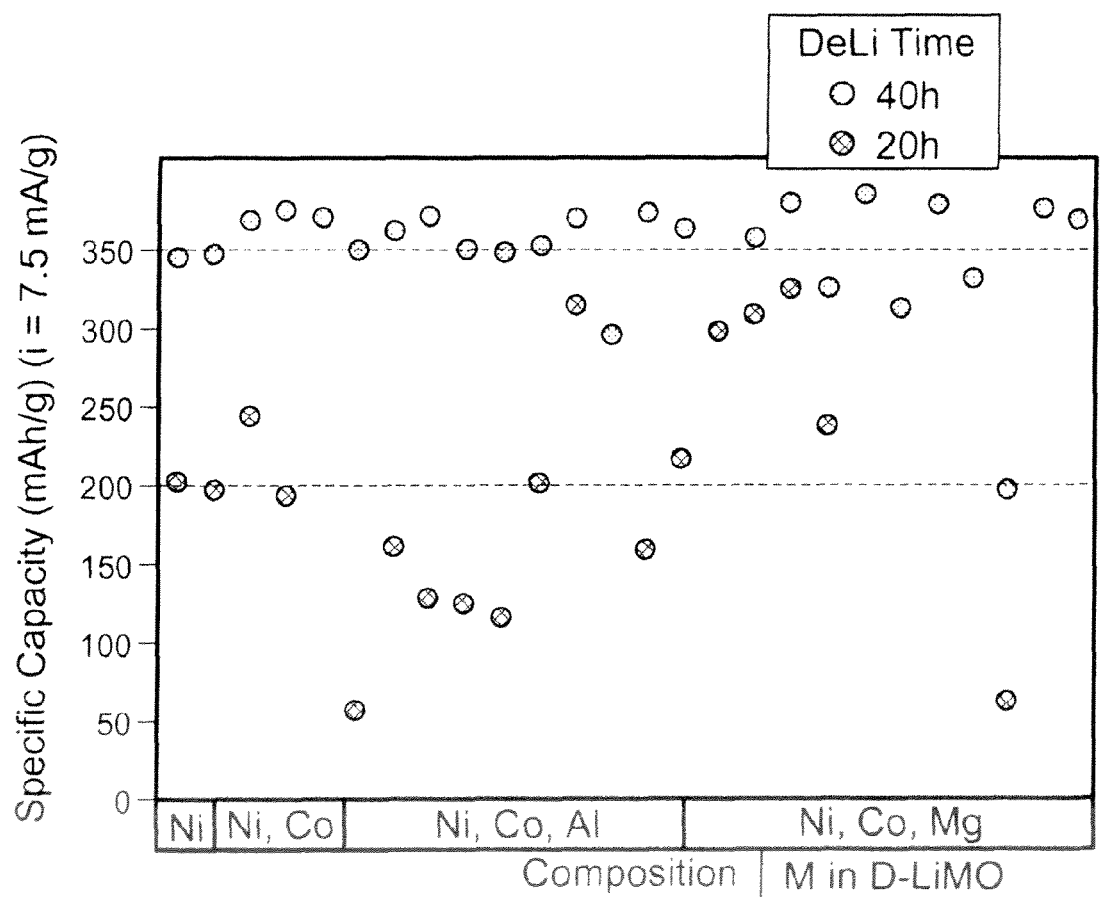
FIG. 8 is a plot depicting a comparison of specific discharge capacities for alkaline button cells containing delithiated undoped nickel (IV) oxide and the delithiated metal-doped nickel (IV) oxides, that were acid-treated for either 40 hours or 20 hours and discharged at a nominal low-rate (i.e., 7.5 mA/g) to a 0.8 V cutoff voltage.

Button cells having the greatest low-rate (i.e., 7.5 mA/g) fresh specific capacities generally contained delithiated metal-doped nickel (IV) oxides having nickel partially substituted by a combination of cobalt and magnesium and a total substitution level of less than about 10 atom%. The average discharge capacity values generally ranged from about 365 to 375 mAh/g and corresponded to about 110-112% of that for cells containing delithiated undoped nickel oxide. Similarly, cells containing delithiated singly-doped nickel (IV) oxides in which the nickel ions were partially substituted by only cobalt, magnesium or aluminum ions at a level of less than about 5 atom % had specific capacities that were up to about 108-109% of those for cells with undoped nickel (IV) oxide. Most of the cells containing either delithiated singly or multiply-doped nickel (IV) oxides had low-rate discharge capacities that were either comparable to or slightly greater (e.g., 5% greater) than control cells containing a delithiated undoped nickel (IV) oxide. Further, cells containing delithiated metal-doped Ni(IV) oxides that had been acid-treated for 40 hours or greater consistently had >80% higher capacities than cells containing delithiated metal-doped nickel (IV) oxides acid-treated for only 20 hours as shown in FIG. 8.

Button cells containing delithiated metal-doped nickel (IV) oxides discharged at a relative high-rate (e.g., 60 mA/g, 100 mA/g) had specific capacities that generally were comparable to or even slightly greater than that of cells containing delithiated doped nickel (IV) oxide. Surprisingly, the high-rate capacities for nearly all the cells containing delithiated metal-doped nickel (IV) oxides were comparable to (i.e., 95-101% of the low-rate capacity) or even slightly greater (i.e., 104-114% of the low-rate capacity) than the corresponding low-rate capacities. For several compositions having relatively high metal dopant levels of either Mg or Al (e.g., $Ni_{0.92}M_{0.08}O_2$, M=Mg, Al), the high-rate discharge capacities were substantially greater than the corresponding low-rate capacities. This is consistent with a relatively low level of cell polarization and excellent high-rate performance for cells containing delithiated metal-doped nickel (IV) oxides.

Post-storage capacity retention was determined for button cells containing delithiated metal-doped nickel (IV) oxides discharged at low-rate after holding for 1 week at 25° C. and 45° C. Average discharge capacities after storage at 25 and 45° C. as well as the corresponding calculated percent capacity retentions are summarized in Table 4. Capacities of cells containing delithiated metal-doped nickel (IV) oxides stored at 25° C. for 1 week and then discharged at low-rate to a 0.8 V cutoff generally ranged from about 85 to 95% of the corresponding fresh capacities (i.e., held for 24 hours at 25° C. before discharge). Capacity retention of cells stored at 45° C. for 1 week ranged from about 80% to 90% of fresh capacities for nearly all the delithiated metal-doped nickel (IV) oxides. Capacity retention for cells containing delithiated undoped nickel (IV) oxide was up to 83%. The highest capacity retention (≥90%) after storage at 45° C. was obtained for cells containing delithiated cobalt and/or magnesium-doped nickel (IV) oxides.

TABLE 4

Discharge capacity retention for alkaline button cells with cathodes containing selected delithiated cobalt/magnesium/aluminum-doped nickel (IV) oxides.

| Ex. No. | Nominal Compositions | Low-rate capacity 24 h@25° C. | Low-rate capacity 1 wk@25° C. | Capacity retention (%) | Low-rate capacity 1 wk@45° C. | Capacity retention (%) |
|---|---|---|---|---|---|---|
| 2b | $NiO_2$ | 334 | 317 | 95 | 278 | 83 |
| 4a | $Ni_{0.96}Co_{0.04}O_2$ | 364 | | | 321 | 88 |
| 4b | $Ni_{0.92}Co_{0.08}O_2$ | 358 | 333 | 93 | 314 | 88 |
| 4c | $Ni_{0.88}Co_{0.12}O_2$ | 337 | | | 302 | 90 |
| 4d-1 | $Ni_{0.98}Mg_{0.02}O_2$ | 359 | | | 322 | 90 |
| 4e-1 | $Ni_{0.96}Mg_{0.04}O_2$ | 365 | 347 | 95 | 308 | 84 |
| 4f-1 | $Ni_{0.92}Mg_{0.08}O_2$ | 190 | | | 228 | 120 |
| 4g-1 | $Ni_{0.96}Co_{0.02}Mg_{0.02}O_2$ | 322 | | | 287 | 89 |
| 4h-1 | $Ni_{0.92}Co_{0.06}Mg_{0.02}O_2$ | 368 | | | 318 | 86 |
| 4i-1 | $Ni_{0.92}Co_{0.04}Mg_{0.04}O_2$ | 373 | 362 | 97 | — | — |
| 4j-1 | $Ni_{0.92}Co_{0.02}Mg_{0.06}O_2$ | 369 | | | — | — |
| 4k-1 | $Ni_{0.88}Co_{0.10}Mg_{0.02}O_2$ | 303 | | | 265 | 87 |
| 4l-1 | $Ni_{0.88}Co_{0.08}Mg_{0.04}O_2$ | 316 | | | 283 | 90 |
| 4m-1 | $Ni_{0.88}Co_{0.06}Mg_{0.06}O_2$ | 347 | | | 318 | 92 |
| 4n-1 | $Ni_{0.88}Co_{0.04}Mg_{0.08}O_2$ | — | | | 293 | — |
| 4d-2 | $Ni_{0.98}Al_{0.02}O_2$ | 352 | | | 295 | 84 |
| 4e-2 | $Ni_{0.96}Al_{0.04}O_2$ | 363 | 236 | 65 | 324 | 89 |
| 4f-2 | $Ni_{0.92}Al_{0.08}O_2$ | 286 | | | 242 | 85 |
| 4g-2 | $Ni_{0.96}Co_{0.02}Al_{0.02}O_2$ | 359 | | | 302 | 84 |
| 4h-2 | $Ni_{0.92}Co_{0.06}Al_{0.02}O_2$ | 342 | | | 301 | 88 |
| 4i-2 | $Ni_{0.92}Co_{0.04}Al_{0.04}O_2$ | 340 | | | 294 | 86 |
| 4j-2 | $Ni_{0.92}Co_{0.02}Al_{0.06}O_2$ | 351 | | | 292 | 83 |
| 4k-2 | $Ni_{0.88}Co_{0.10}Al_{0.02}O_2$ | 338 | | | 302 | 89 |
| 4l-2 | $Ni_{0.88}Co_{0.08}Al_{0.04}O_2$ | 360 | | | 318 | 88 |
| 4m-2 | $Ni_{0.88}Co_{0.06}Al_{0.06}O_2$ | 340 | | | 266 | 78 |
| 4n-2 | $Ni_{0.88}Co_{0.04}Al_{0.08}O_2$ | 360 | | | 316 | 88 |
| C-2a | $Ni_{0.8}Co_{0.15}Al_{0.05}O_2$ | 325 | | | 230 | 70 |
| C-2b | $Ni_{0.791}Co_{0.149}Al_{0.049}B_{0.01}O_2$ | 335 | | | — | — |

Figure 9:
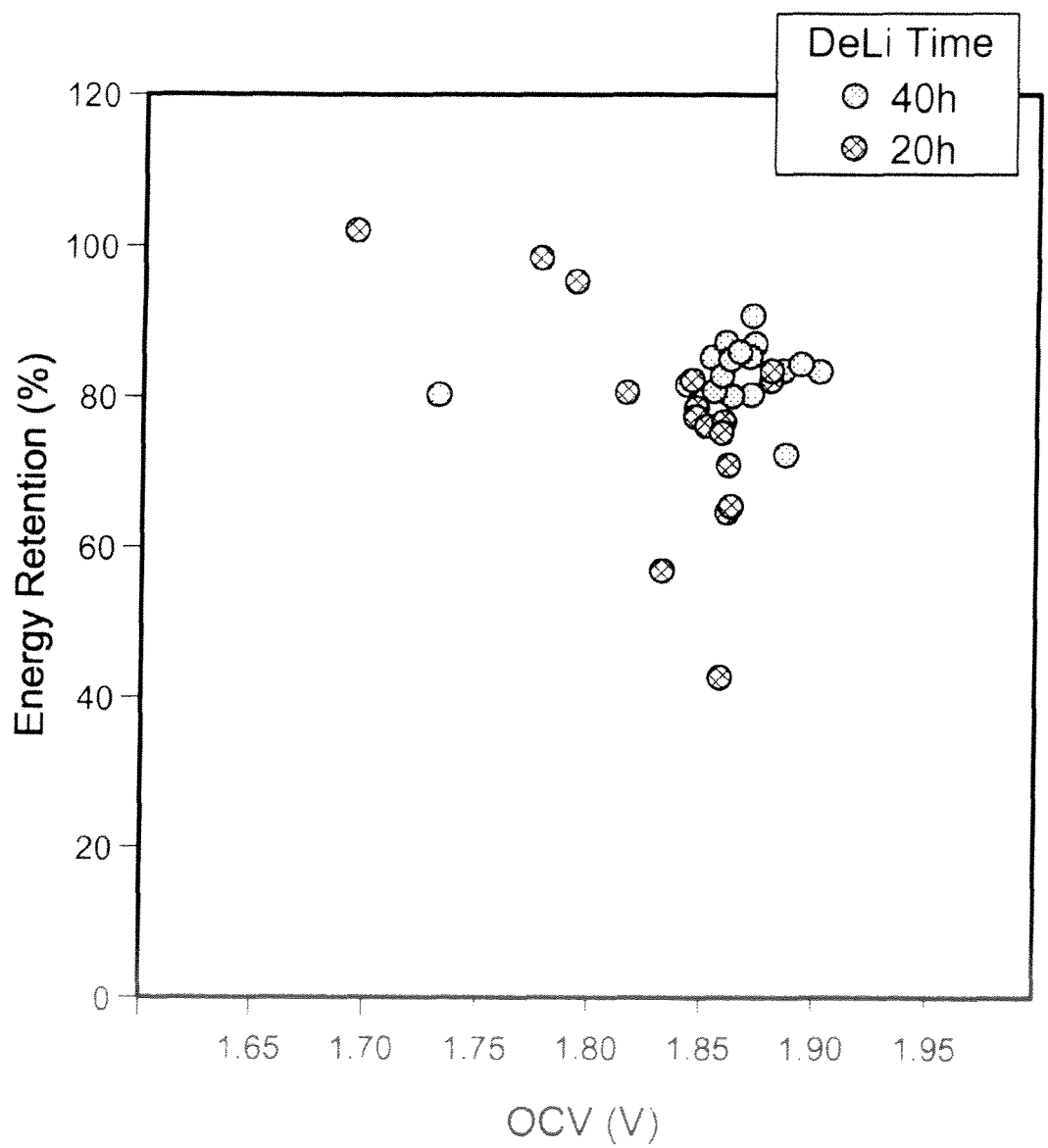
FIG. 9 is a plot depicting a comparison of energy retention values for alkaline button cells containing delithiated metal-doped nickel (IV) oxides that were acid-treated for either 40 hours or 20 hours, and stored at 45° C. for 1 week before discharge versus the corresponding initial OCV values.

Cells containing delithiated cobalt and/or aluminum-doped nickel (IV) oxide generally had lower capacity retention than cells containing cobalt- and/or magnesium-doped nickel (IV) oxide at comparable total metal dopant concentrations. No significant relationship between energy retention and OCV for cells held 24 hours at 45° C. was evident as shown in FIG. 9. Nearly all the cells containing delithiated metal-doped nickel (IV) oxides that had been acid-treated for at least 40 hours had a relatively narrow range of OCV values (e.g., 1.84-1.90 V) and had relatively high capacity retention values ranging from 85 to 90%.

Partial substitution of other metal ions for nickel ions in delithiated lithium nickel oxides having the general formula $Li_xNi_{1-y-z}Co_yM^a_zO_2$, where $M^a$ is selected from magnesium, aluminum, calcium, yttrium, and combinations of these, can produce a substantial decrease in the rate and/or total amount of oxygen evolved by the delithiated metal-doped nickel (IV) oxide compared to a delithiated undoped nickel (IV) oxide when immersed in alkaline electrolyte at 25° C. Button cells containing delithiated cobalt and magnesium-doped nickel (IV) oxides discharged fresh at low-rate can have specific capacities up to 112% of that for cells containing a delithiated undoped nickel (IV) oxide. Low levels of residual lithium in the delithiated metal-doped nickel (IV) oxides are desirable. Residual Li levels corresponding to x<0.1 in the general formula are preferred, while residual Li levels corresponding to x<0.08 are more preferred, and residual Li levels corresponding to x<0.05 are still more preferred.

Comparative Example 1

Discharge of β-Nickel Oxyhydroxide in Alkaline Button Cells

A sample of spherical cobalt oxyhydroxide-coated β-nickel oxyhydroxide powder was prepared from a commercial spherical β-nickel hydroxide (e.g., Kansai Catalyst Co., Ltd., Osaka, Japan) as disclosed by the general method disclosed, for example, in U.S. Pat. No. 8,043,748.

A cathode mix was prepared by blending an oxidation-resistant graphite and an electrolyte solution containing 35.3 wt % KOH and 2 wt % zinc oxide with spherical β-nickel oxyhydroxide powder in a weight ratio of nickel oxyhydroxide:graphite:electrolyte of 75:20:5. Button cells were fabricated by the general method described in Example 2. The cells of Comparative Example 1 were tested within 24 hours after fabrication. OCV measured immediately before discharge was 1.72 V. Cells were discharged at about 10 mA/g constant current corresponding to a nominal C/30 rate to a 0.8 V cutoff voltage. Average discharge capacity for the cells of Comparative Example 1 was about 200 mAh/g.

Comparative Example 2

Synthesis of Delithiated $Li_x(Ni_{0.8}Co_{0.15}Al_{0.05})O_2$ and $Li_x(Ni_{0.8}Co_{0.15}Al_{0.05})_{0.99}B_{0.01}O_2$ Samples of commercial lithium nickel cobalt aluminum oxide powders (Toda America Inc., Battle Creek, Mich.) having nominal compositions $LiNi_{0.8}Co_{0.15}Al_{0.05}O_2$ and $Li(Ni_{0.8}Co_{0.15}Al_{0.05})_{0.99}B_{0.01}O_2$ (i.e., $LiNi_{0.792}Co_{0.149}Al_{0.049}B_{0.01}O_2$) were delithiated by the acid treatment process of Example 2 above to form the delithiated metal-substituted Ni(IV) oxides of Comparative Examples 2a and 2b, respectively. Button cells were fabricated by the general method of Example 2. The cells of Comparative Example 2 were tested within 24 hours after fabrication. OCV values ranged from about 1.83 to 1.85 V. Cells were discharged at a low rate of about 10 mA/g constant current corresponding to a nominal C/30 rate to a 0.8 V cutoff voltage. Discharge curves for cells containing the delithiated cobalt and aluminum-doped nickel oxide of Comparative Example 2a and the cobalt, aluminum, and boron-doped nickel oxide of Comparative Example 2b are compared to those for cells containing the delithiated $Li_x$-$NiO_2$ of Example 2b and a commercial battery-grade EMD in FIG. 10. Average discharge capacities for cells containing the delithiated cobalt/aluminum/boron-doped nickel oxides of Comparative Examples 2a and 2b were 325 mAh/g and 335 mAh/g, respectively.

Comparative Example 3

Synthesis of Delithiated $Li_xNi_{1-y}Co_yO_2$ (y=0.1, 0.2)

Samples of commercial lithium nickel cobalt oxide powders (e.g., NEI Corp., Somerset, N.J.) having nominal chemical compositions of $LiNi_{0.9}Co_{0.1}O_2$ and $LiNi_{0.8}Co_{0.2}O_2$ were delithiated by the acid treatment process of Example 2 above to form the delithiated metal-doped nickel(IV) oxides of Comparative Examples 3a and 3b, respectively. Button cells were fabricated by the general method of Example 2. The cells of Comparative Example 3 were tested within 24 hours after fabrication. The OCV value was typically about 1.81 V. Cells were discharged at a low rate of about 10 mA/g constant current corresponding to a nominal C/30 rate to a 0.8 V cutoff voltage. Average discharge capacities for cells containing the delithiated cobalt-doped nickel oxides of Comparative Examples 3a and 3b were about 355 mAh/g and 335 mAh/g, respectively.

A number of embodiments of the invention have been described. Nevertheless, it will be understood that various modifications may be made without departing from the spirit and scope of the invention.

For example, a delithiated metal-doped nickel(IV)-containing complex oxide can be used as the active material in the positive electrode of an electrochemical capacitor (i.e., super-capacitor, ultra-capacitor, pseudo-capacitor). In some embodiments, a delithiated or a partially delithiated nickel(IV)-containing complex oxide can function as an oxidation catalyst. For example, the complex oxide can be included in the cathode of a metal-air battery, for example, a zinc-air cell. In some embodiments, a delithiated nickel(IV)-containing oxide can function as an efficient catalyst for breakdown of water to generate molecular oxygen.

In some embodiments, a delithiated metal-doped nickel(IV) oxide can function as the cathode active material in a rechargeable alkali metal-ion battery, a rechargeable alkaline earth metal-ion battery, a primary alkali metal battery or a primary alkaline earth metal battery including an aqueous, non-aqueous, polymeric or solid electrolyte. The alkali metal can be selected from Li, Na, K, or a combination thereof. The alkaline earth metal can be selected from Mg, Ca, or a combination thereof.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

Other embodiments are within the scope of the following claims.

What is claimed is:

1. A method of making a battery, comprising incorporating a cathode including as the cathode active material a lithium-deficient doped nickel(IV)-containing oxide having a formula $A_xNi_{1-y-z-w}Co_yM^a_zM^b_wO_2$ wherein A comprises lithium, $M^a$ is selected from the group consisting of Ca, Mg, Al, Y, Mn, and any combination thereof; and $M^b$ is selected from the group consisting of B, Si, Ge, and any combination thereof; $0 \leq x \leq 0.08$; $0 \leq w \leq 0.02$; and $0.02 \leq y+z \leq 0.25$.

2. The method of claim 1, further comprising incorporating an anode including zinc or zinc alloy particles, an alkaline electrolyte solution, and a separator into the battery.

3. The method of claim 1, wherein the cathode further includes an oxidation-resistant, electrically-conductive carbon additive.

4. The method of claim 3, wherein the oxidation-resistant, electrically-conductive carbon additive is selected from synthetic, non-expanded oxidation-resistant graphite, graphitized carbon black, vapor phase grown carbon fibers, and carbon nanofibers.

5. The method of claim 3, wherein the carbon additive is included in the cathode at a level of between 3% and 20% of the total cathode weight.

6. The method of claim 3, wherein the carbon additive is included in the cathode at a level of between 3% and 10% of the total cathode weight.

7. The method of claim 1, wherein the lithium-deficient doped nickel(IV)-containing oxide is selected from the group consisting of $Li_xNi_{1-y}Co_yO_2$, $Li_xNi_{1-z}Mg_zO_2$, $Li_xNi_{1-y-z}Co_yMg_zO_2$, $Li_xNi_{1-z}Al_zO_2$, $Li_xNi_{1-y-z}Co_yAl_zO_2$, $Li_xNi_{1-z}(Mg, Al)_zO_2$, $Li_xNi_{1-y-z}Co_y(Mg, Al)_zO_2$, $Li_xNi_{1-z}Ca_zO_2$, $Li_xNi_{1-y-z}Co_yCa_zO_2$, $Li_xNi_{1-z}Y_zO_2$, $Li_xNi_{1-y-z}Co_yY_zO_2$, $Li_xNi_{1-z}Mn_zO_2$, and $Li_xNi_{1-y-z}Co_yMn_zO_2$.

8. The method of claim 1, further comprising incorporating an aqueous alkaline electrolyte solution.

* * * * *